(12) United States Patent
Utsunomiya et al.

(10) Patent No.: US 8,363,239 B2
(45) Date of Patent: Jan. 29, 2013

(54) DISPLAYING UNCOMPLETED JOBS IN RESPONSE TO PRINT REQUEST

(75) Inventors: Takeshi Utsunomiya, Yokohama (JP); Hiroyoshi Yoshida, Ohta-ku (JP); Hirohiko Tashiro, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/358,135

(22) Filed: Jan. 25, 2012

(65) Prior Publication Data

US 2012/0120452 A1 May 17, 2012

Related U.S. Application Data

(63) Continuation of application No. 11/673,524, filed on Feb. 9, 2007, now Pat. No. 8,115,940.

(30) Foreign Application Priority Data

Feb. 15, 2006 (JP) .................. 2006-038479

(51) Int. Cl.
*G06F 3/12* (2006.01)
*G06F 3/00* (2006.01)
*G06K 15/00* (2006.01)
*H04N 1/60* (2006.01)

(52) U.S. Cl. ....... 358/1.13; 358/1.18; 358/1.9; 358/501; 710/18; 710/19

(58) Field of Classification Search ................ 358/1.13, 358/1.18, 1.9, 501; 710/18, 19
See application file for complete search history.

(56) References Cited

U.S. PATENT DOCUMENTS

| | | | | |
|---|---|---|---|---|
| 6,985,245 | B1 * | 1/2006 | Takahashi | .................... 358/1.15 |
| 2003/0074387 | A1 | 4/2003 | Tanaka | |

FOREIGN PATENT DOCUMENTS

| | | |
|---|---|---|
| JP | 5-67111 A | 3/1993 |
| JP | 11-353138 A | 12/1999 |
| JP | 2001-026169 A | 1/2001 |
| JP | 2005-053001 A | 3/2005 |
| JP | 2006-026992 A | 2/2006 |

OTHER PUBLICATIONS

Japanese Office Action for JP 2006-038479, dated Mar. 18, 2011.

* cited by examiner

*Primary Examiner* — Thomas Lett

(74) *Attorney, Agent, or Firm* — Rossi, Kimms & McDowell LLP

(57) ABSTRACT

This invention allows a user to immediately grasp the print status of a job only by inputting a print instruction of a job stored and held in an image forming apparatus. This invention also provides a user-friendly apparatus that notifies the user of a predicted time until completion of printing. For this purpose, the image forming apparatus of this invention has a touch panel formed on the display screen of the operation unit. A list of jobs registered in a Hold job list is displayed on the display screen. When the user selects at least one job and touches a "Test print" or "Print" button, the print job is registered in the print execution queue. Simultaneously, a list of unprinted print jobs registered in the print execution queue is automatically displayed.

32 Claims, 24 Drawing Sheets

FIG. 9

| | TYPE | DOCUMENT NAME | PAPER | PAGES | DATE / TIME |
|---|---|---|---|---|---|
| | ▫ | DOCUMENT P | A4 | 0105 | 10/22 13:23 |
| 1 | ▫ | DOCUMENT Q | A4 | 0238 | 10/22 14:54 |
| | ▫ | DOCUMENT R | A3 | 0028 | 10/29 17:08 |
| | ▫ | DOCUMENT S | A4 | 0193 | 11/01 19:41 |

USER BOX  /  01 : USER B  ---  TOTAL 4

CANCEL SELECTION | DETAILED INFORMATION ▶ | ERASE
PRINT ▶ | MOVE / COPY ▶ | SEND ▶

CLOSE ↵

SYSTEM STATUS / STOP ▶

FIG. 10A
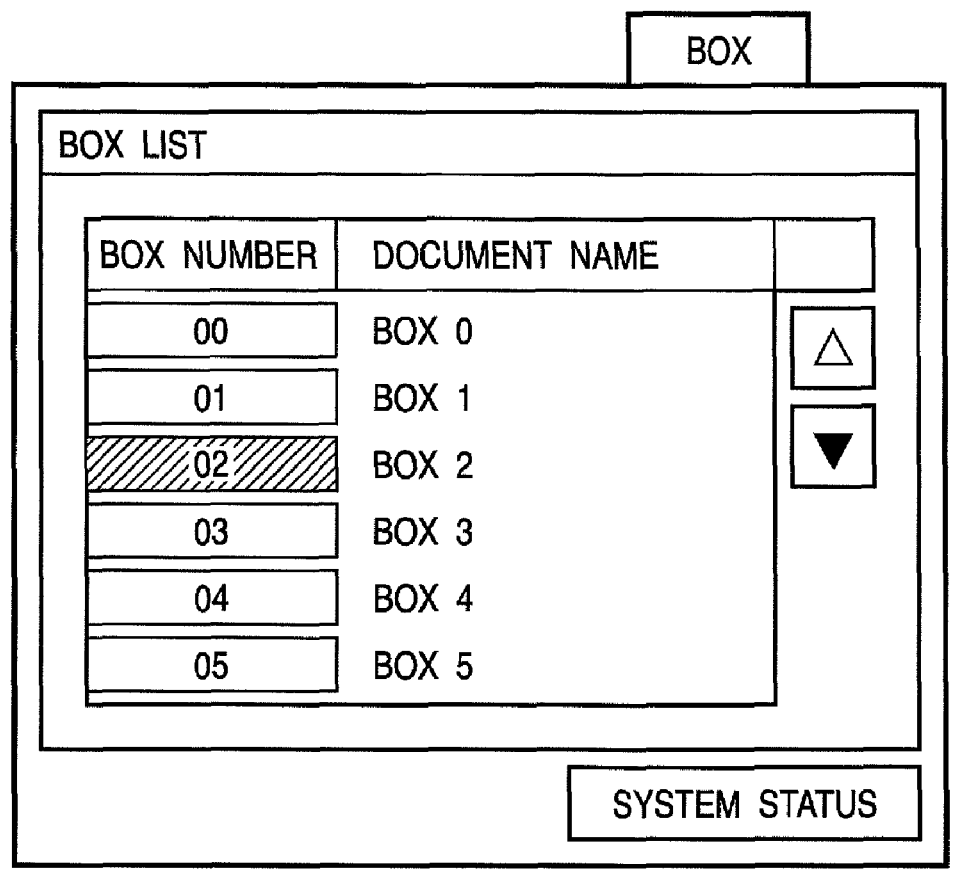
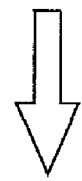
TO FIG.10B

TO FIG.10C

| RECEIPT NUMBER | DOCUMENT NAME | USER NAME | STATUS |
|---|---|---|---|
| 001 | DOCUMENT 1 | USER 1 | Held |
| 002 | DOCUMENT 2 | USER 2 | Held |
| 003 | DOCUMENT 3 | USER 3 | Held |

BOX JOB LIST

BOX

PRINT

CLOSE

SYSTEM STATUS

TO FIG.10D

FIG. 10D
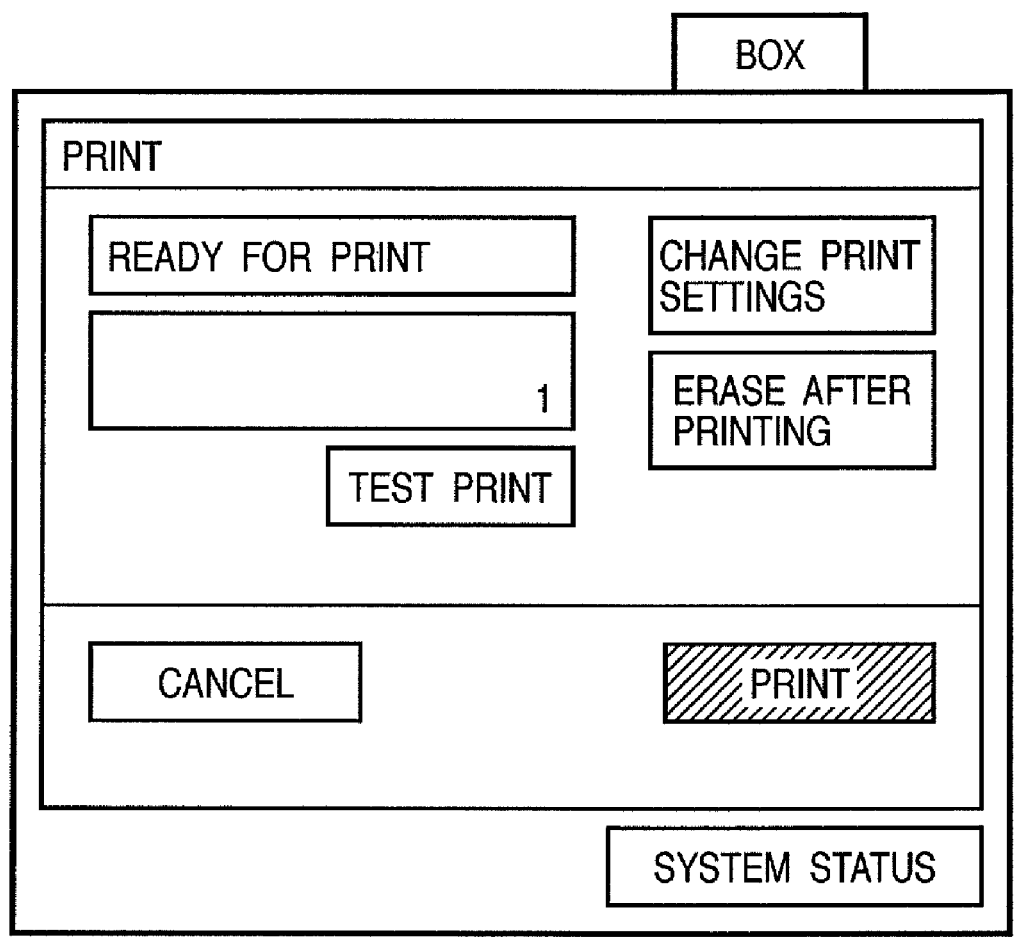
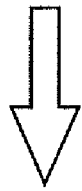
TO FIG.10A

FIG. 12A

HOLD TAB

HOLD JOB LIST

| RECEIPT NUMBER | DOCUMENT NAME | USER NAME | STATUS |
|---|---|---|---|
| 001 | DOCUMENT 1 | USER 1 | Held |
| 002 | DOCUMENT 2 | USER 2 | Held |
| 003 | DOCUMENT 3 | USER 3 | Held |

[ PREVIEW ] [ TEST PRINT ] [ PRINT ] [ ERASE ] [ EDIT ]

ACTIVE JOB LIST

FIG. 12B

HOLD TAB

ACTIVE JOB LIST

| RECEIPT NUMBER | DOCUMENT NAME | USER NAME | STATUS | PREDICTED TIME |
|---|---|---|---|---|
| 123 | DOCUMENT 99 | USER 99 | Print | 10 MIN |
| 124 | DOCUMENT 98 | USER 98 | STANDBY | 20 MIN |
| 125 | DOCUMENT 3 | USER 3 | STANDBY | 30 MIN |

[ PRIORITY PRINT ] [ STOP ] [ DETAILED INFORMATION ] [ PAUSE ]

HOLD JOB LIST

JOB MANAGEMENT TABLE

ACTIVE JOB  HOLD JOB  BOX JOB

| JOB ID | POINTER TO ATTRIBUTE INFORMATION MANAGEMENT TABLE | POINTER TO IMAGE DATA |
|---|---|---|
| 100 | | |
| 200 | • | • |
| 300 | | |
| ⋮ | | |

ATTRIBUTE INFORMATION MANAGEMENT TABLE

| ATTRIBUTE | ATTRIBUTE ID | SETTING VALUE |
|---|---|---|
| JOB NAME | 1 | "JOB-A" |
| NUMBER OF COPIES | 2 | 100 |
| OUTPUT PAPER SIZE | 3 | A3 |
| PAPER TYPE | 4 | PLAIN PAPER |
| PRINT METHOD | 5 | DOUBLE-SIDED |
| | 6 | |
| COLOR MODE | 7 | MONOCHROME |
| ⋮ | | |

IMAGE DATA

DISPLAYING UNCOMPLETED JOBS IN RESPONSE TO PRINT REQUEST

CROSS REFERENCE TO RELATED APPLICATION

This application is a continuation of prior U.S. patent application Ser. No. 11/673,524, filed Feb. 9, 2007, for which benefit is claimed and status is pending, which in turn claims priority from JP Application No. 2006-038479, filed Feb. 15, 2006. The entire disclosure of the documents cited in this section is hereby incorporated herein by reference.

BACKGROUND OF THE INVENTION

1. Field of the Invention

The present invention relates to an image forming technique of forming an image on a print medium by executing a print process based on a received print job.

2. Description of the Related Art

A conventionally known technique involves receiving print jobs, sequentially storing them in a memory device, and displaying the list of the names of images stored in the memory device. When a user selects one of the jobs in the list, the image is printed (e.g., Japanese Patent Laid-Open No. 5-067111).

In the above-described prior art, if a user who has instructed an image forming apparatus to print a job wants to confirm the state of the job, he/she must switch the display to a window to confirm the job state during the print process. This requires a user operation.

For example, when a user has selected a job from a list of stored jobs and input a print instruction, he/she may want to know the print completion timing of the print job. If the printer is a shared printer, it may be processing a plurality of print jobs input by other users. In this case, the user may want to know the position of his/her print-instructed job in all the jobs that are being processed and the time required until print completion.

SUMMARY OF THE INVENTION

The present invention has been made to meet this requirement, and has as its object to provide a technique of allowing a user to grasp the state of progress of a print target job upon only instructing a print process of a stored and registered job. It is another object to provide a technique of notifying a user of a predicted time required until completion of a print instruction target job.

In order to achieve the above-described objects, for example, an image forming apparatus of the present invention has the following arrangement.

That is, there is provided an image forming apparatus for forming an image on a print medium based on print job data received from an external device and outputting the image, comprising:

a holding unit which holds a received print job in a memory unit;

a first display unit which displays a list of print jobs held by the holding unit so as to allow a user to select a print job;

a detection unit which detects input of a print instruction for a job selected by the user from the jobs in the list displayed by the first display unit;

a registration unit which registers the job selected by the user in a print execution queue to execute a print process in accordance with the input of the print instruction detected by the detection unit; and a second display unit which displays a list of unprinted print jobs in the print execution queue in accordance with the input of the print instruction detected by the detection unit.

According to the present invention, the user can immediately grasp the print status of a job by inputting a print instruction of a job stored and held in the image forming apparatus. In addition, a user-friendly apparatus that allows the user to predict the time until completion of printing can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view showing a display example of a list of jobs registered in a selected box;

FIGS. 10A to 10D are views showing transition of a Box tab window;

FIGS. 12A and 12B are views showing transition of a window when a job in the hold tab is selected;

DESCRIPTION OF THE EMBODIMENTS

The embodiments of the present invention will be described below in detail with reference to the accompanying drawings.

Figure 1:
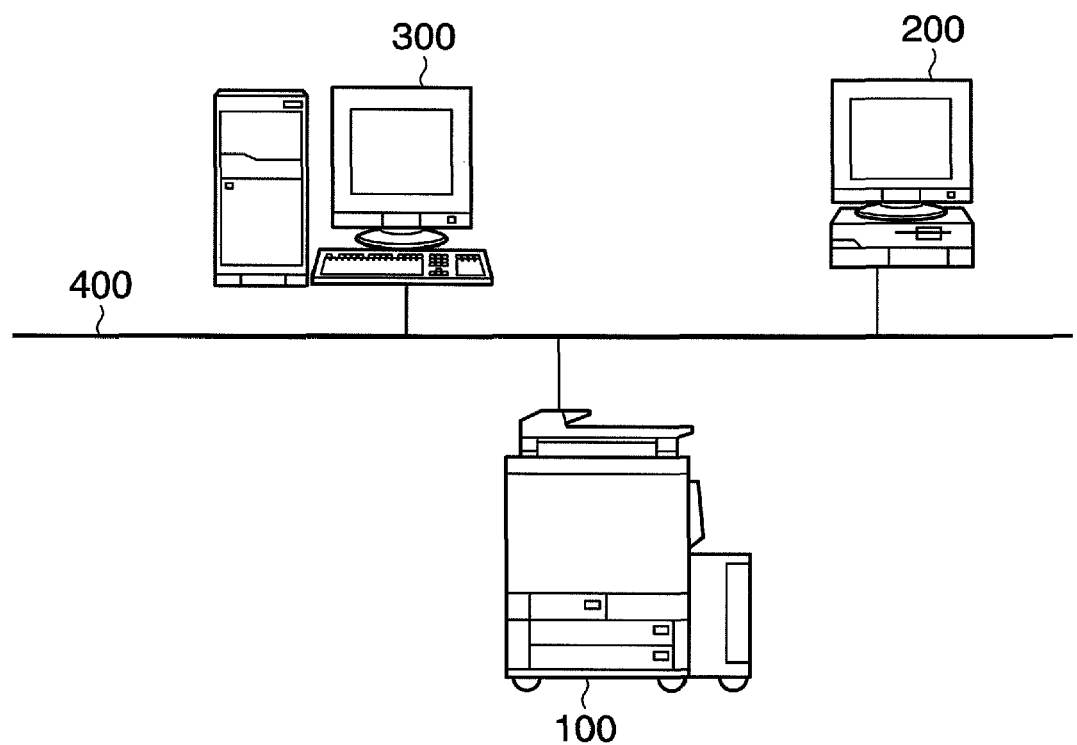
FIG. 1 is a view showing the system configuration according to the embodiment.

FIG. 1 is a block diagram showing the basic configuration of an entire network system according to the embodiment. As shown in FIG. 1, an MFP (Multi Function Peripheral) 100, client PC 200, and print server 300 connect to a network 400. In the example illustrated in FIG. 1, one device of the each type connects to the network. However, the number of connected devices is not limited to this.

The MFP 100 is a device including a scanner unit to read a document and a print unit to form (print) an image on a print medium such as a printing paper sheet and having various functions such as network scanner, network printer, and copy.

The client PC 200 executes various kinds of applications in accordance with user instructions and outputs print data to the network in response to a print request from the user. The client PC 200 also executes processes of assisting monitoring and control of devices and jobs managed in the print server 300. Print data generated by the client PC is transferred to the MFP 100 directly or via the print server 300.

Figure 2:
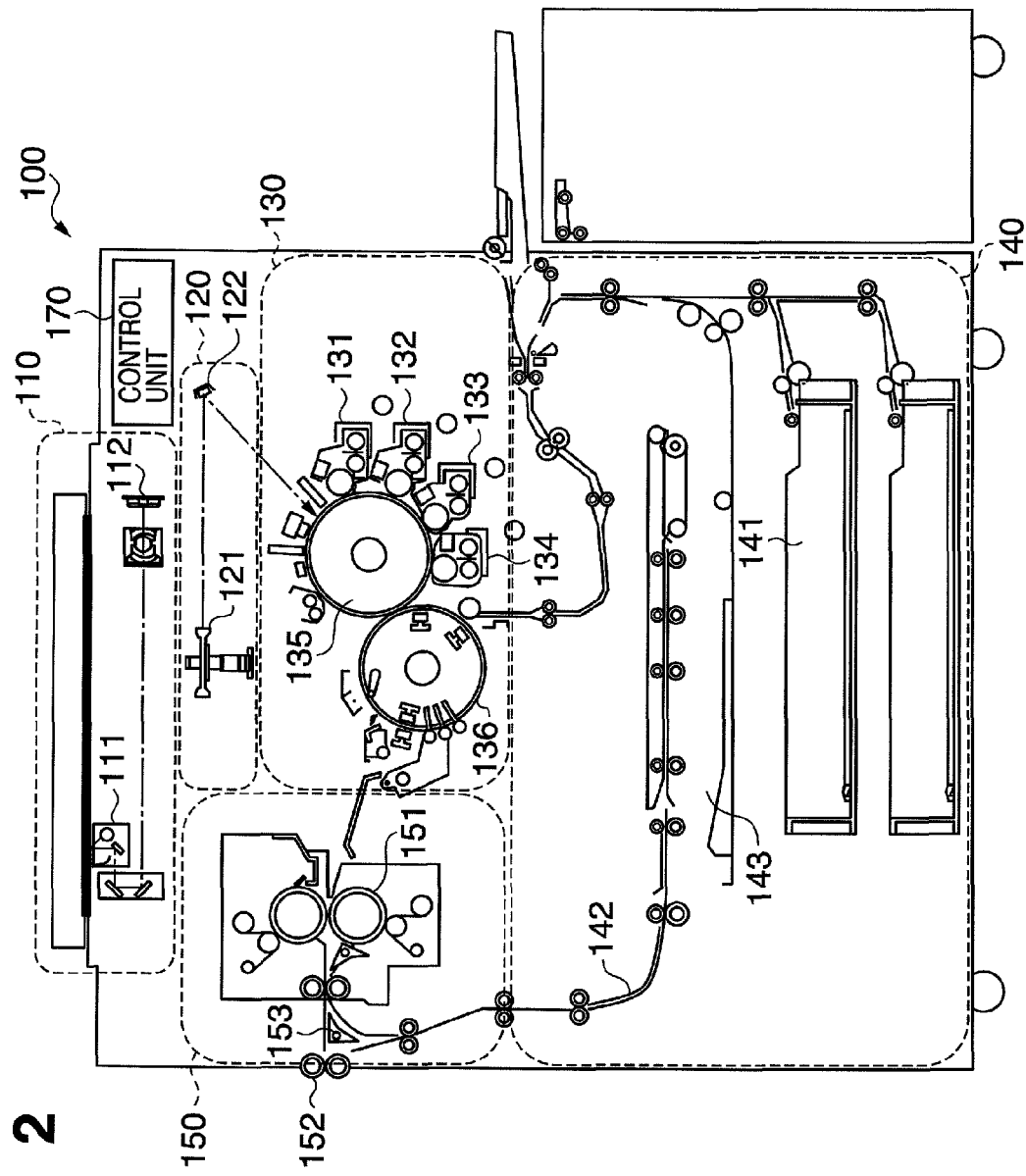
FIG. 2 is a sectional view showing the structure of a multi function peripheral (MFP) according to the embodiment.

The arrangement of the MFP 100 will be described next with reference to FIG. 2. FIG. 2 is a sectional view showing the structure of the MFP 100.

The MFP 100 comprises a scanner unit 110 that reads an image printed on a document surface, a printer unit including units 120 to 150, and a control unit 170.

The control unit 170 to control the overall apparatus is mounted in it as a printed board including a microprocessor. The control unit 170 executes the process of the scanner unit 110, network communication, processes corresponding to various operation contents from the user, and a print process to be described below.

The scanner unit 110 comprises an exposure unit 111 that moves while exposing and scanning a document surface, and a line CCD 112 that forms an image of reflected light from the document surface and converts the light into an electrical signal. The control unit 170 A/D-converts signals sequentially output from the line CCD 112 into image data and executes various processes.

The laser exposure unit 120 included in the printer unit comprises a polygon mirror 121 that is rotated by a motor to sweep a laser beam from a laser element (not shown) driven by the control unit 170, and a mirror 122 that reflects the laser beam to a photosensitive drum 135.

The image forming unit 130 rotates the photosensitive drum 135 and causes a charger to charge its surface. The photosensitive drum 135 holds an electrostatic latent image on its surface when the laser exposure unit 120 sweeps the laser beam. Developing units 131 to 134 having color toners of magenta (M), cyan (C), yellow (Y), and black form toner images by applying the toners to the electrostatic latent image formed on the surface of the photosensitive drum 135. The toner images formed on the photosensitive drum 135 are transferred to a printing paper sheet serving as a print medium. To do this, a transfer drum 136 that rotates together with the photosensitive drum 135 is provided. The printing paper sheet fed from the feed/conveying unit 140 winds around the transfer drum 136 due to an electrostatic action. The transfer drum 136 transfers the toner image of one color component generated on the photosensitive drum 135 onto the printing paper sheet wound around itself. By repeating this process four times, the images of the four color components are formed on the printing paper sheet.

When the toner images of the four color components are transferred to the printing paper sheet in the above-described manner, the control unit 170 peels the printing paper sheet off from the transfer drum 136 and conveys it to the fixing unit 150. The fixing unit 150 incorporates a fixing roller 151 heated by a heat source such as a halogen heater. The fixing roller 151 dissolves and fixes the toners, which are transferred to the printing paper sheet conveyed from the image forming unit 130, on the printing paper sheet by heat and pressure. A discharge roller 152 discharges the printing paper sheet with the fixed toners to an external unit (finisher device).

The MFP 100 of this embodiment can also execute double-sided print. A printing paper sheet sensor is provided upstream the discharge roller 152 (on the image forming unit side). In the double-sided print mode, when the sensor detects the trailing edge of the printing paper sheet, the control unit 170 rotates a flapper 153 by a predetermined angle and reversely rotates the discharge roller 152 so that the printing paper sheet is turned over and conveyed to a double-sided conveying path 142 in the feed/conveying unit 140.

The feed/conveying unit 140 has a double-sided print sheet storage 143 for storing printing paper sheets with one printed surface for the double-sided conveying path 142 and at least one sheet storage 141 represented by a sheet cassette and a paper deck. One sheet is separated from a plurality of sheets stored in the sheet storage, and conveyed to the image forming unit 130 and fixing unit 150 in accordance with an instruction from the control unit 170.

The arrangement of the control unit 170 of the MFP 100 according to the embodiment will be described next with reference to FIG. 3.

The control unit 170 of the MFP 100 has an MFP control unit 1000 including a microprocessor and a memory to store process programs. The MFP control unit 1000 executes traffic control by, e.g., temporarily storing image data in accordance with the application purpose of the MFP and determining the data path between various kinds of processing units to be described below.

The control unit 170 comprises a hard disk (to be referred to as an HDD hereinafter) 1500 serving as a mass memory capable of storing a plurality of job data. Any memory other than the hard disk is usable if it has a large capacity and is random-accessible.

The MFP control unit 1000 implements a plurality of functions including a copy process of job data output from the scanner and a print process based on job data output from the client PC on the network by using the HDD 1500 as a buffer.

The MFP includes a full-color device and a monochrome device. Their basic constituent elements are the same except the color process and internal data. The full-color device includes the arrangement of the monochrome device. Hence, only the full-color device will mainly be described here, and an explanation of the monochrome device will be added as needed.

Figure 3:
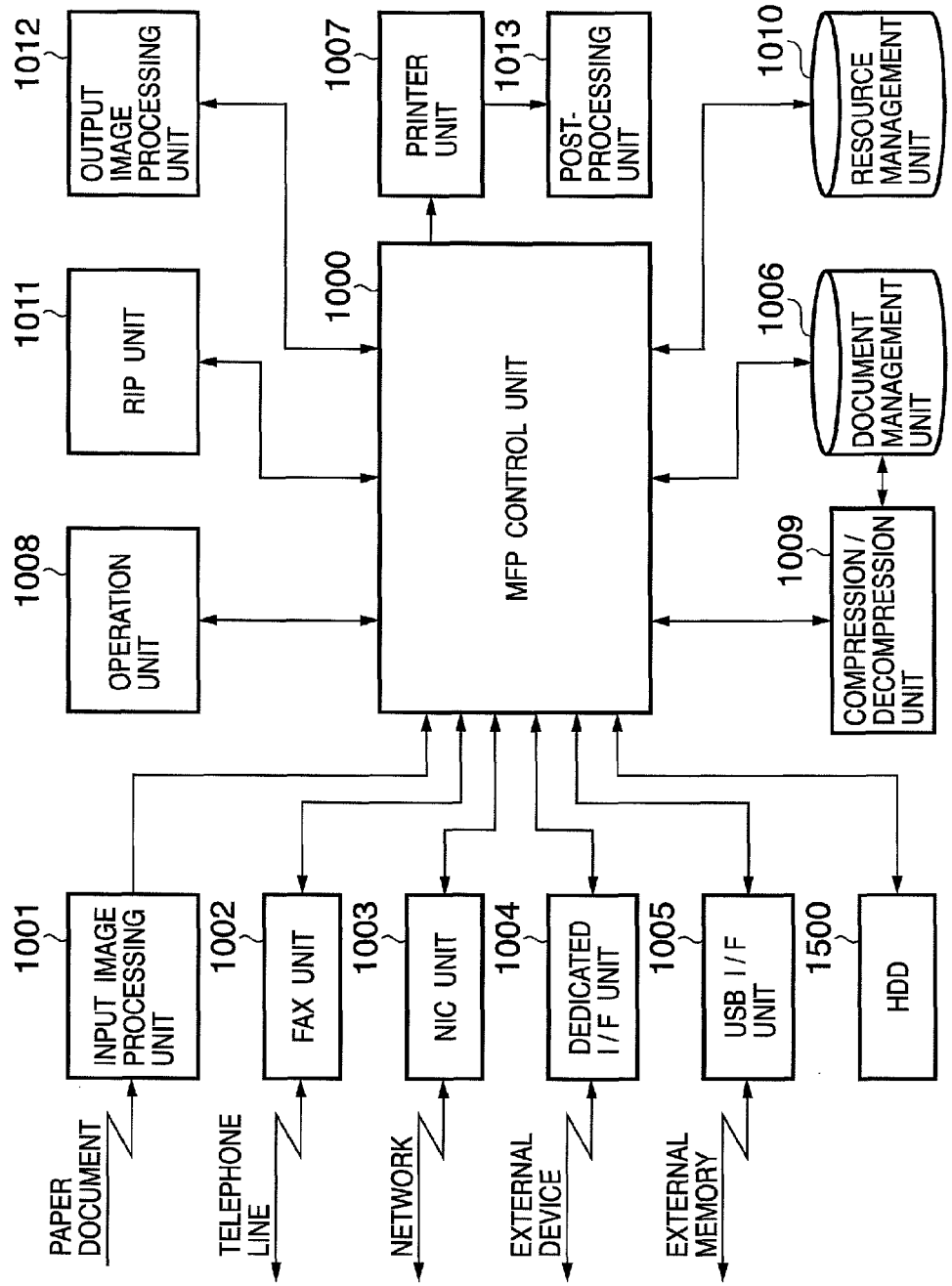
FIG. 3 is a block diagram showing the detailed arrangement of the control unit of the MFP according to the embodiment.

As shown in FIG. 3, many processing units connect to the MFP control unit 1000. An input image processing unit 1001 reads an image of, e.g., a paper document and processes the read image data. A FAX unit 1002 executes image transmission/reception represented by a facsimile using a telephone line. An NIC (Network Interface Card) unit 1003 transmits/receives image data and device information using the network. A dedicated I/F unit 1004 exchanges information such as image data with an external device. A USB (Universal Serial Bus) I/F unit 1005 transmits/receives, e.g., image data to/from a USB device represented by a USB memory (a kind of removable media).

A document management unit 1006 stores, in the HDD 1500, image data from the input image processing unit 1001, image data of a facsimile job input via the FAX unit 1002, image data input from an external device such as a computer via the NIC unit 1003, and various image data input via the dedicated I/F unit 1004 and USB I/F unit 1005 under the control of the MFP control unit 1000. The document management unit 1006 reads out image data from the HDD 1500 as needed under the control of the MFP control unit 1000. The MFP control unit 1000 determines the output destination of image data read out by the document management unit 1006. For example, when the MFP control unit 1000 sets the output designation to a printer unit 1007, a print process is executed. As a result, a print process of copying, network printing, or facsimile reception can be done. The MFP control unit 1000 also transfers image data read out from the HDD 1500 to an external device such as another computer or another image forming apparatus in accordance with an operator instruction from an operation unit 1008.

The document management unit 1006 compresses image data as needed and stores it in the HDD 1500. Conversely, in reading out compressed image data, the document management unit 1006 decompresses (decodes) the compressed image data into original image data. For this purpose, a compression/decompression unit 1009 is provided. If data received via the NIC unit 1003 is compressed data such as JPEG, JBIG, or ZIP data, the MFP control unit 1000 causes the compression/decompression unit 1009 to reconstruct (decompress) the data.

A resource management unit 1010 readably holds and manages various kinds of commonly handled parameter tables including fonts, a color profile, and a gamma table under the control of the MFP control unit 1000. The resource management unit 1010 also stores a new parameter table or corrects and updates a parameter table in response to a request from the MFP control unit 1000.

A process executed by the MFP control unit 1000 upon receiving print data (PDL data) from the NIC unit 1003 or dedicated I/F unit 1004 will be described next.

When the MFP control unit 1000 receives PDL data, a RIP unit 1011 executes a RIP (raster image processor) process. The MFP control unit 1000 causes an output image processing unit 1012 to process a print target image, as needed, to prepare for print. Intermediate data or print ready data (bitmap data for printing or compressed bitmap data) of the image data is generated and stored in the HDD 1500 via the document management unit 1006. The storage process in the HDD 1500 is executed asynchronously with the printer unit 1007.

The MFP control unit 1000 reads out, via the document management unit 1006, image data of each page from the HDD 1500 and outputs the image data to the printer unit 1007 in accordance with its print process timing. At this time, the MFP control unit 1000 controls a post-processing unit 1013 in accordance with the description of the print job. The post-processing unit 1013 controls the finisher device that executes a sheet sorting process and a sheet finishing process.

The process of the MFP control unit 1000 of the embodiment has roughly been described above. The MFP control unit 1000 according to the embodiment switches the path, i.e., the flow of image data to be processed in the following way. Although the MFP control unit 1000 also processes intermediate data, a description thereof will be omitted. Accesses other than those with the document management unit 1006 serving as starting and ending points will be omitted. The processes of the compression/decompression unit 1009 and post-processing unit 1013 which are used as needed will be omitted to clarify the basic flow.

A) Copy function: input image processing unit→output image processing unit→printer unit B) FAX transmission function: input image processing unit→FAX unit C) FAX reception function: FAX unit→output image processing unit→printer unit D) Network scan: input image processing unit→NIC unit E) Network print: NIC unit→RIP unit→output image processing unit→printer unit F) Scan to external device: input image processing unit→dedicated I/F unit G) Printing from external device: dedicated I/F unit→output image processing unit→printer unit H) Scan to external memory: input image processing unit→USB I/F unit I) Printing from external memory: USB I/F unit→RIP unit→output image processing unit→printer unit J) Box scan function: input image processing unit→output image processing unit→document management unit K) Box print function: document management unit→printer unit L) Box reception function: NIC unit→RIP unit→output image processing unit→document management unit M) Box transmission function: document management unit→NIC unit N) Preview function: document management unit→operation unit Although combinations with various functions are also available, including an e-mail service and a Web server function, an explanation thereof will be omitted.

Box scan, box print, box reception, and box transmission are MFP processing functions including write/read in/from the HDD 1500 via the document management unit 1006. "Box" indicates a box (folder or directory) provided in the HDD 1500. This is a function of causing the document management unit 1006 to temporarily save data in the HDD 1500 in correspondence with each job or each user and input/output the data by combining a user ID and a password.

The operation unit 1008 functions as a user interface to select the above-described various flows and functions and give the instruction for their execution. To present various display menus to the user and preview image data managed by the document management unit 1006, the MFP has a high-resolution display device, various kinds of instruction buttons, and a touch panel. The user operates the operation unit 1008 even in a copy mode.

An example of the process by the MFP control unit 1000 according to the embodiment will be described with reference to FIG. 4. The microprocessor included in the MFP control unit 1000, the memory storing the firmware, and various processing units shown in FIG. 3 implement this process.

A network interface control unit 1601 controls the NIC unit 1003. The document management unit 1006 analyzes a communication protocol, receives data from the host computer, and transfers the received data to a job ticket analysis unit. A job ticket analysis unit 1602 analyzes a job ticket, transmits the attribute of the job to a job control unit 1600, registers the job in a management table (not shown), and stores PDL data in the reception buffer.

Upon detecting PDL storage in the reception buffer, a PDL data analysis unit 1603 starts analyzing the PDL data. More specifically, the PDL data analysis unit 1603 reads out the PDL data from the reception buffer, analyzes it, generates objects (intermediate codes) corresponding to commands, and stores them in the intermediate buffer. In this embodiment, a command supported by a printer is PDL (Page Description Language). Not only PDL data but also any data printable in correspondence with each page undergoes the same process. The PDL data analysis unit 1603 stores the intermediate data as the analysis result in the intermediate buffer to easily manage the intermediate data.

Upon detecting data storage in the intermediate buffer, a rendering processing unit 1604 starts a rendering process. More specifically, the rendering processing unit 1604 reads out the intermediate data of each page from the intermediate buffer, and in a normal print mode (when neither BOX storage nor HOLD storage is instructed), generates print image data of one page and stores it in the image buffer.

Upon detecting storage of the image data of one page in the image buffer, an output control unit 1605 reads out the image data and outputs it to the printer unit.

For a job designated for Hold storage, the rendering processing unit 1604 sequentially stores the rendered image data of the respective pages in the Hold queue. The output control unit 1605 is not immediately activated. The job is printed in response to a Hold cancel (print) instruction from a UI control unit 1606.

The Hold function temporarily stores a job in a memory means such as an HDD instead of printing the job immediately. Printing starts upon receiving a user instruction from an operation unit 1008. This function is used to, e.g., start actual printing (multiple copy) after test print without any problem in the print result. With this function, it is unnecessary for the host computer to retransmit the job data for actual printing.

For a job with a Box storage designation, the rendering processing unit 1604 stores rendered image data of each page in a Box. A "Box" is equivalent to a folder (directory). Even when the image data is stored in the Box, the output control unit 1605 is not activated immediately. The output control unit 1605 is activated when the UI control unit 1606 outputs a print instruction of the job in the Box. Boxes are named, e.g., "01" to "99". The user can selectively use the boxes in correspondence with each user or each application purpose. The user can set a password for each Box.

The UI control unit 1606 controls the UI (User Interface). The UI control unit 1606 transfers display data to the operation unit 1008 and notifies the MFP control unit 1000 of input from the operation unit 1008. In this embodiment, the display unit provided on the operation unit 1008 is a liquid crystal display. The operation unit 1008 has several keys. The liquid crystal display has a touch panel on its front surface. The UI control unit 1606 controls to display a character string corresponding to a user operation, switch the window, and transmit setting values to another module.

The job control unit 1600 manages jobs in the device and controls generation and disappearance of jobs, the states of jobs, and the job process order.

Especially, the job control unit 1600 incorporates a print execution queue to determine which one of the Box, image buffer, and Hold queue stores image data to be output to the output control unit 1605 (the print execution queue is provided in a RAM because the information amount is small, though it may be provided in the HDD). For a normal print job, information (job ID to be described later) to specify the job is automatically set in the print execution queue. The job ID of a job in the Box or Hold queue is registered in the print execution queue when the user executes printing. The job control unit 1600 determines based on the job ID registered in the print execution queue which one of the Box, image buffer, and Hold queue stores the image data. Upon determining the storage source, the job control unit 1600 controls to output image data of each page contained in the job to the output control unit 1605.

Figure 21:
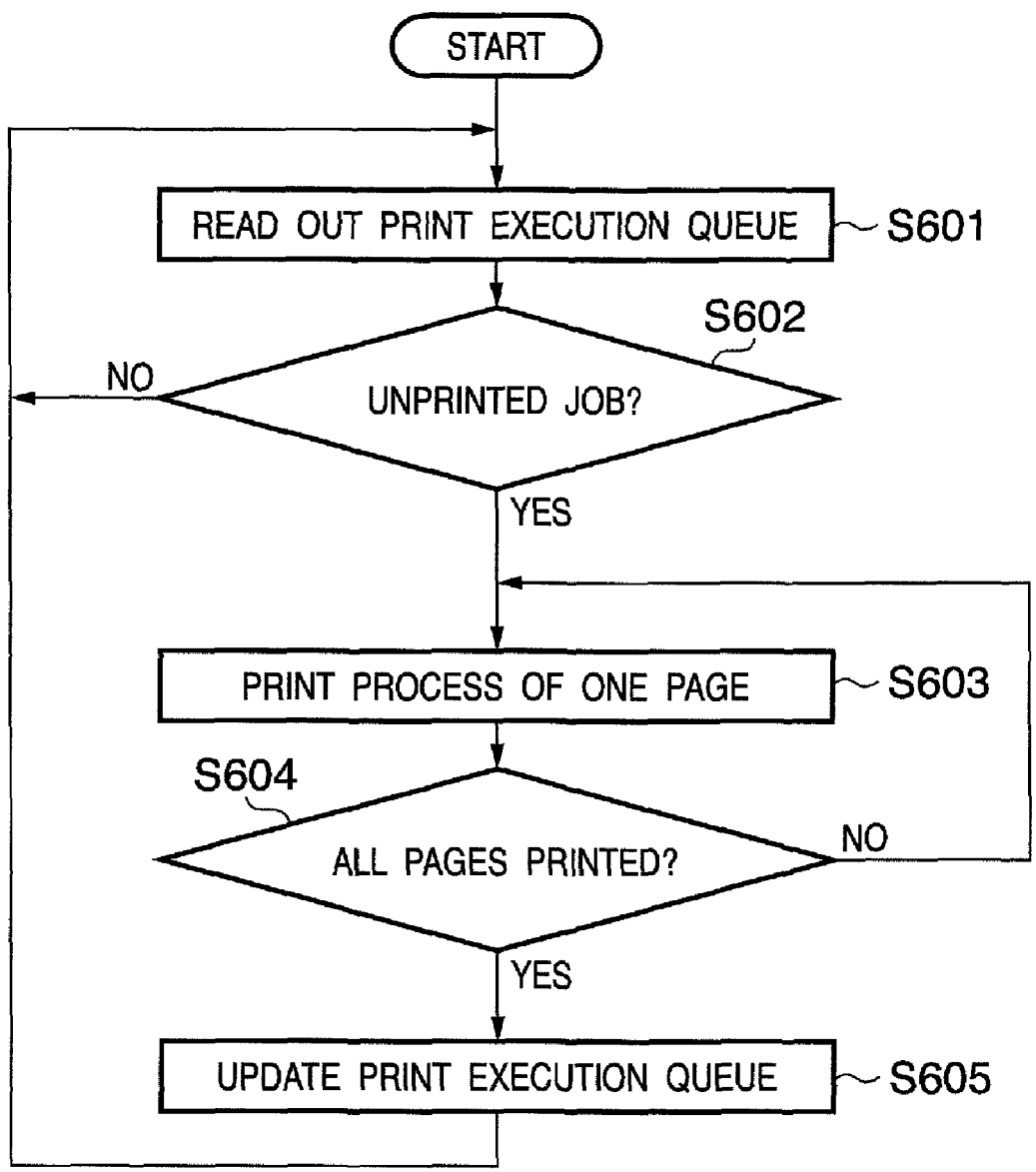
FIG. 21 is a flowchart showing a print process procedure registered in a print execution queue according to the embodiment.

The process of the job control unit 1600 as one of process programs of the MFP control unit 1000 will be described with reference to the flowchart in FIG. 21.

In step S601, the MFP control unit 1000 reads out the print execution queue. In step S602, the MFP control unit 1000 determines whether an unprinted print job exists. If the result is "NO" in step S602, the process returns to step S601.

If the MFP control unit 1000 determines that an unprinted print job exists in the print execution queue, the process advances to step S603. In step S603, the MFP control unit 1000 determines based on the job ID (to be described later) of the unprinted print job which one of the Box, image buffer, and Hold queue stores the image data, reads out image data of one page, and executes the print process. This process is repeated until the MFP control unit 1000 determines in step S604 that all pages are printed.

Upon determining that all pages are printed, the MFP control unit 1000 deletes the print job ID of interest from the print execution queue and the print job data from the HDD. In test print, the MFP control unit 1000 deletes the job ID from the print execution queue but not the entity of print job data (and job management table), as will be described later.

On the other hand, various kinds of applications and a printer driver to use the MFP 100 of the embodiment are installed in the client PC 200 (FIG. 1).

Figure 5:
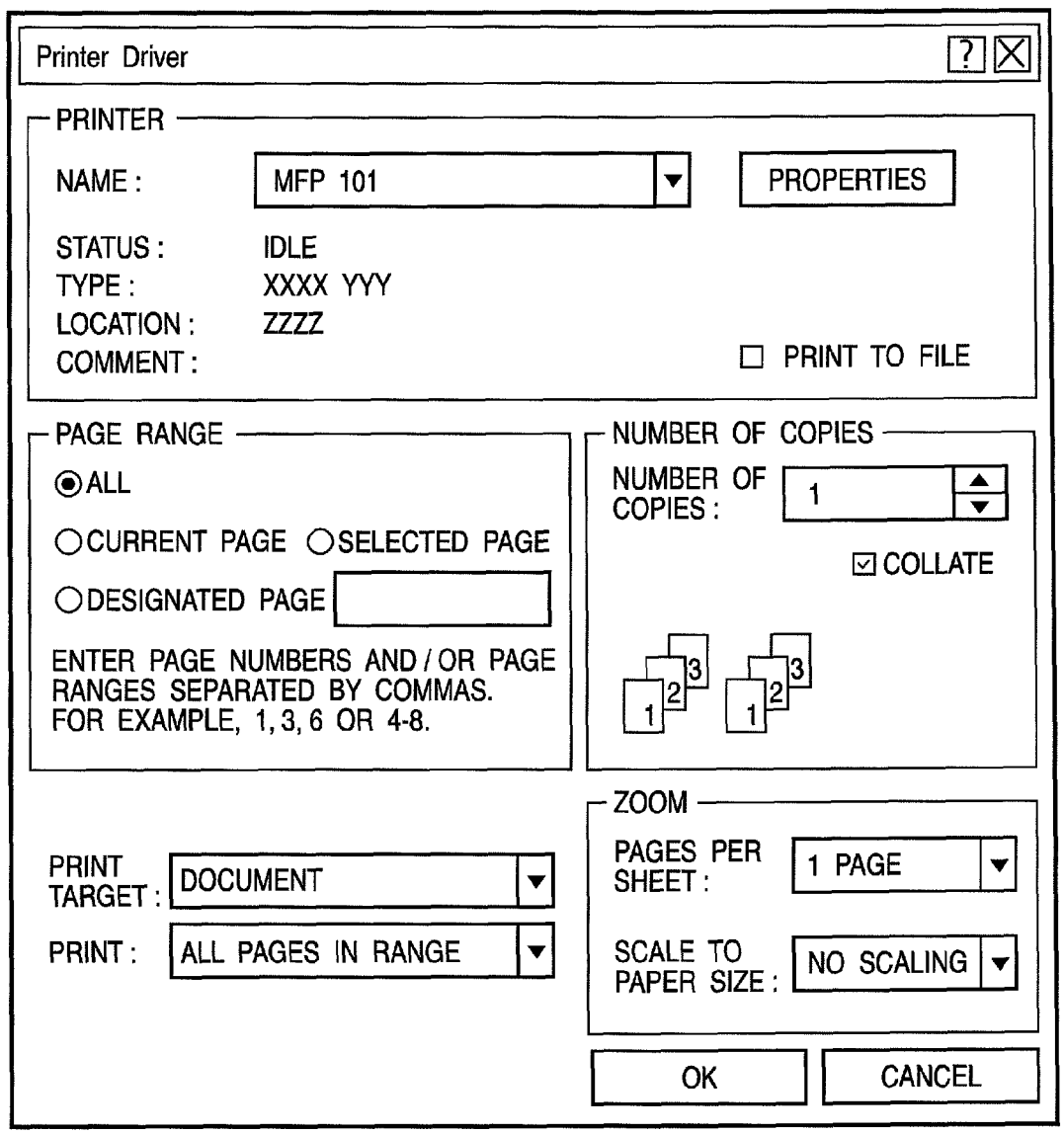
FIG. 5 is a view showing an example of the setting window of a printer driver executed by a host computer.

FIG. 5 is a view showing an example of a print setting window by the printer driver of the client PC 200. When the user selects the print menu of an application that is being executed, the printer driver displays this window.

"Name" in this setting window is a pull-down list box. The user selects a printer to use by using a pointing device. Then, the status of the print device, the type of the printer driver, print device installation location information, and comment information from the print device manager are displayed in "Status", "Type", "Location", and "Comment", respectively, under "Name". These pieces of information are obtained by issuing an information transfer request message to the printer upon displaying the setting window or selecting the printer to use.

To output print data not to the print device but to a file, the user selects the "Print to file" check box. As a result, print data generated by the printer driver can be stored in the memory device of the client PC as a file.

"Page range" includes "All", "Current page", "Selected page", and "Designated page" radio buttons as items to select print target pages. The user selects one of the radio buttons (default is "All"). When the user selects "Designated page" by using the pointing device, the edit box changes to an input enable state. The user inputs the numbers of pages to print by using a keyboard.

A "Print target" pull-down list box allows the user to select the attribute of a print target document. A "Print" pull-down list box allows the user to designate whether to print all pages or only odd- or even-numbered pages.

In "Number of copies", the user can set the number of copies to print. The user inputs the number of copies to print in a "Number of copies" spin box. To print a plurality of copies not by pages but by collating, the user selects a "Collate" check box.

In "Zoom", the user can designate N-up print (print N pages laid out on one print surface) by a Pages per sheet" pull-down list box. A "Scale to paper size" pull-down list box selects a paper size corresponding to a document size.

A "Properties" button is used to set more detailed print properties.

The user who has completed settings in the printer driver setting window can cause a print device such as an MFP to print the print data or output the print data to a file by clicking on an "OK" button. To stop printing or output to a file, the user clicks on a "Cancel" button.

Figure 6:
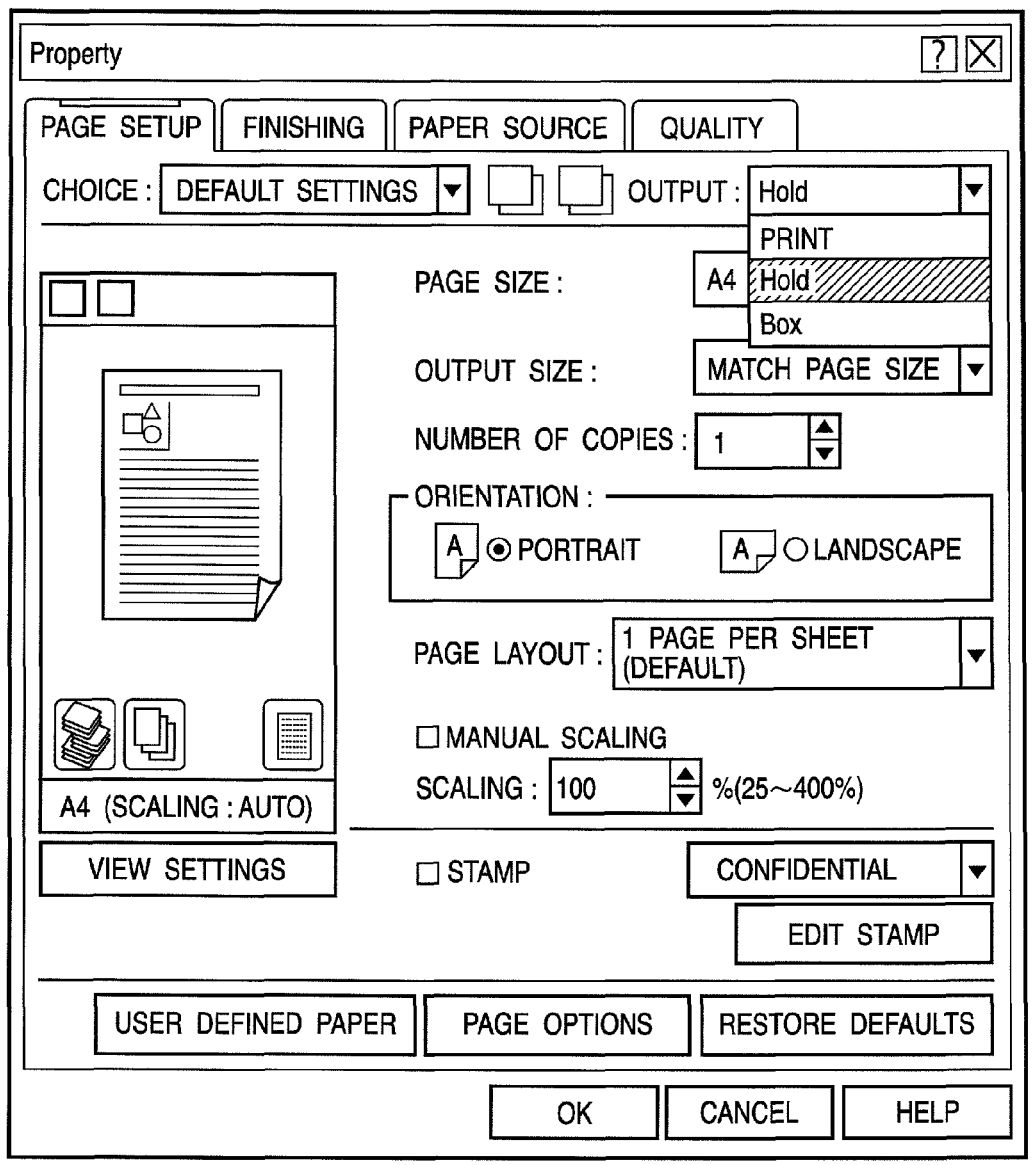
FIG. 6 is a view showing an example of the property setting window of the printer driver executed by the host computer.

FIG. 6 is a view showing an example of a setting window that is displayed when the user clicks on the "Properties" button in the window shown in FIG. 5 by the pointing device. This setting window has a plurality of tabs. In the initial state, a "Page setup" tab is selected.

A "Choice" pull-down list box selects optimum page setup from predetermined page setup modes. The user can add/edit an item to/in "Choice" by using two buttons located on the left side.

Upon detecting click on a "View Settings" button, the MFP control unit 1000 displays the print image of the first page in a page image region above the button in accordance with the contents set in the property setting window.

An "Output" pull-down list box designates an output method, i.e., whether to cause a print device such as an MFP to normally print the image, save the image data in the Hold queue (hard disk) of the print device, or save the image data in the BOX (hard disk) (the Box is equivalent to a folder).

When the user designates the Hold queue, the printer driver generates and outputs print data with a job ticket representing the Hold queue. Upon receiving the print data, the MFP control unit 1000 executes the process of generating a print image and then the process of storing each page in the Hold queue. That is, the MFP control unit 1000 does not execute the print process. The print process starts when the MFP control unit 1000 determines that a print instruction has been received from the operation unit 1008.

When the user designates the BOX, the printer driver displays a selection menu to prompt the user to select a Box. Since the name of each Box is managed by a numeric string, the printer driver may display a text region to input the numeric string. The printer driver generates a job ticket containing information to specify the Box and generates and outputs print data containing the job ticket. Upon receiving the print data, the MFP control unit 1000 executes the process of generating a print image and then the process of storing each page in the designated Box. That is, the MFP control unit 1000 does not execute the print process. The print process starts when the MFP control unit 1000 determines that a print instruction is received from the operation unit 1008.

"Page size" and "Output size" pull-down list boxes are used to select the size of the print target document and the output paper size of the print device.

A "Number of copies" spin box is used to input a desired number of copies to print. "Orientation" radio buttons are used to select the orientation of the output paper of the print device from "Landscape" and "Portrait".

A "Page layout" pull-down list box designates N-up printing (print N pages laid out on one print surface). If the user selects a "Manual scaling" check box, he/she can input a zoom scaling factor as a percentage in a "Scaling" spin box.

If the user selects a "Stamp" check box, he/she can select one of predetermined types of stamps in the pull-down list box. By clicking on an "Edit stamp" button, the user can add or edit the type of a watermark.

A "User defined paper" button allows the user to define the paper. A "Page options" button allows the user to set more detailed page options. A "Restore defaults" button returns various setting contents to the default setting contents.

The user completes setup in the property setting window of the printer driver and clicks on the "OK" button. Upon detecting click on the "OK" button, the printer driver reflects the print attributes on actual printing. To stop setup in the property setting window, the user clicks on the "Cancel" button. A "Help" button is used to display the help window of the property setting window.

Upon detecting a user's click on the "OK" button in FIG. 5, the CPU of the client PC receives data transferred from the application and generates print data containing a job ticket and PDL data in accordance with the printer driver program. After that, the OS of the client PC transfers the print data to the MFP 100 of the embodiment as a print job.

Figure 7:
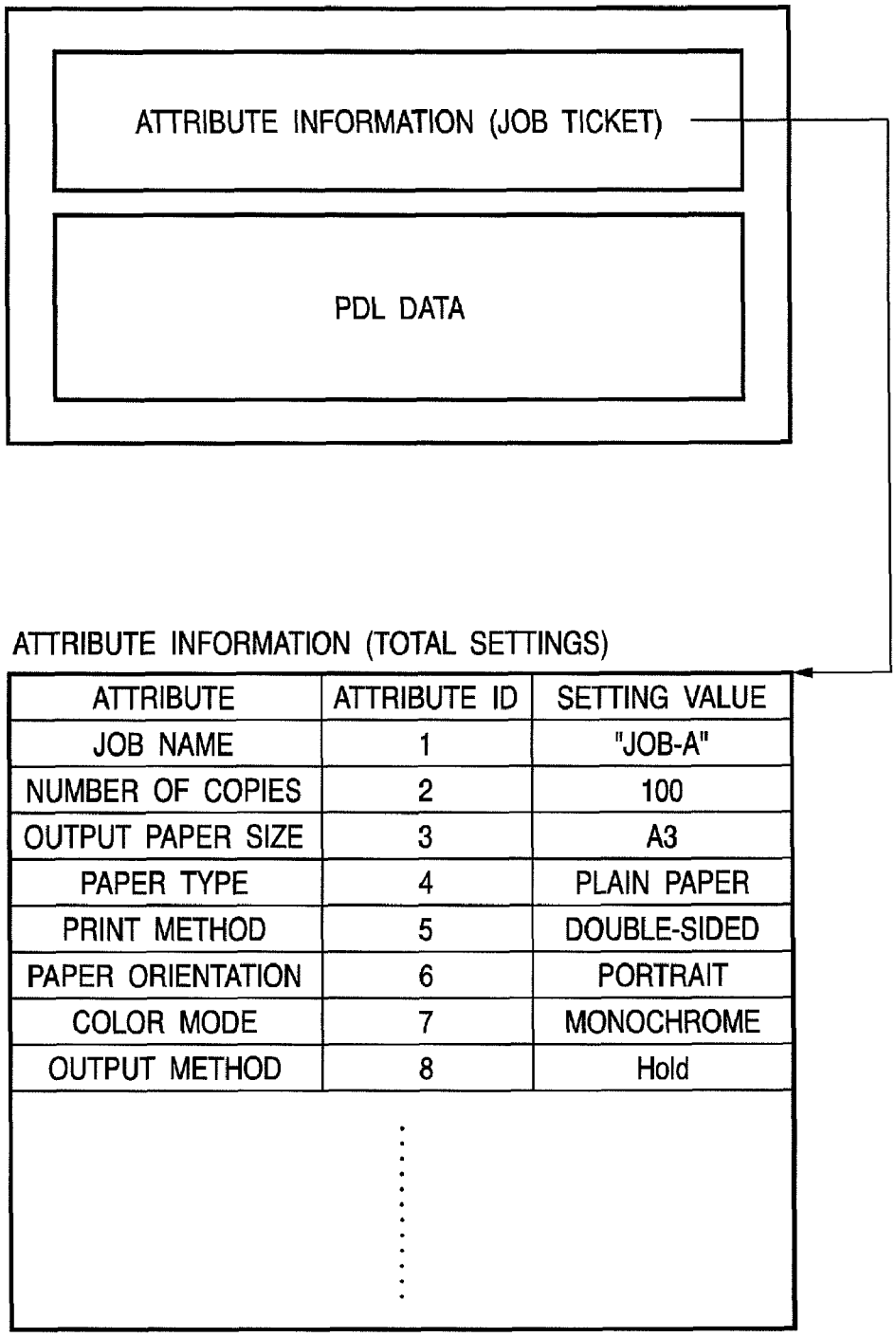
FIG. 7 is a view showing the structure of job data generated by the printer driver.

FIG. 7 shows the structure of a print job transferred to the MFP 100. The print job data contains attribute information (job ticket) and PDL data.

Attribute information (total settings) stores the attribute IDs and setting values of attributes such as "job name", "number of copies", "output paper size", "paper type", "print method", "paper orientation", and "color mode". The attribute information is described in the XML format or the like.

In the example shown in FIG. 7, attribute information (exceptional settings) stores information of "start page" and "end page" as an "application range", and the attribute IDs and setting values of attributes such as "job name", "number of copies", "output paper size", "paper type", "print method", "paper orientation", "color mode", and "output method". Each attribute has a setting value corresponding to setup in the driver setting window and property setting window. The output method indicates "Hold".

Figure 8A:
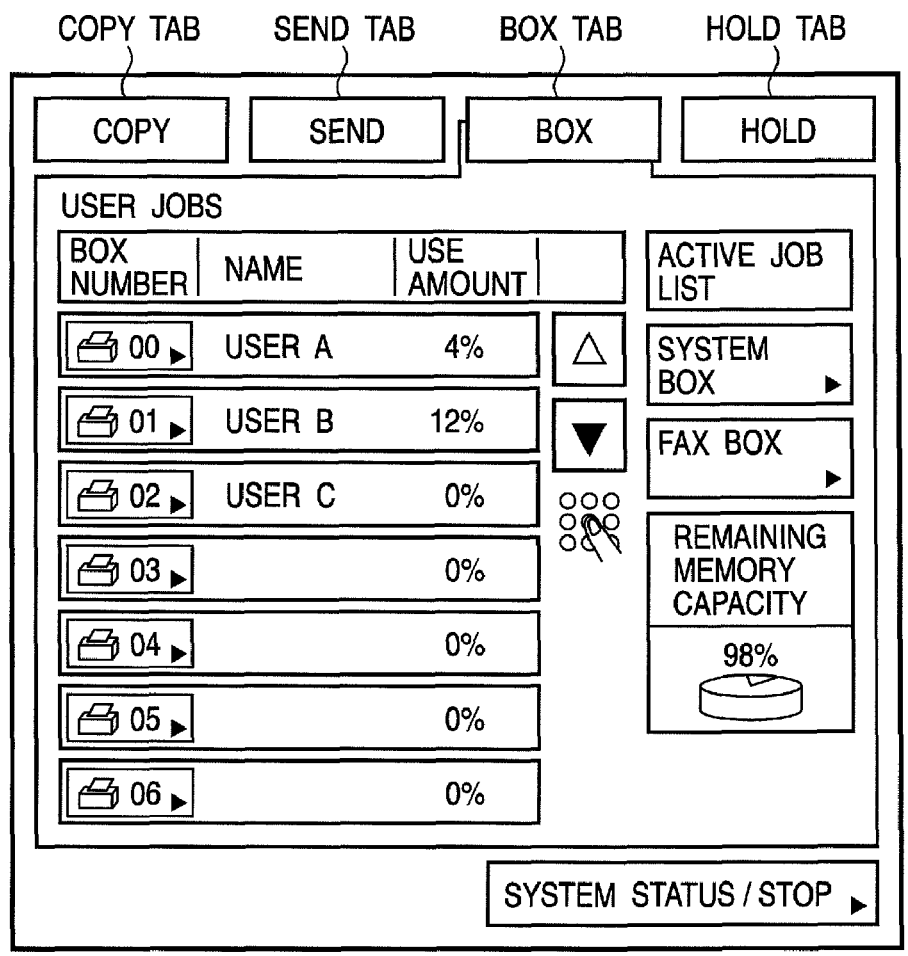
FIGS. 8A and 8B are views showing a display example of a Box tab in the touch panel unit of the MFP according to the embodiment.

The operation unit 1008 provided in the MFP 100 according to the embodiment will be described next. FIG. 8A shows an example of a window displayed on the display unit of the operation unit 1008 of the MFP 100.

The operation unit 1008 according to the embodiment uses a touch panel. There are tabs corresponding to functions. In this embodiment, "Copy", "Send", "Box", and "Hold" tabs exist. FIG. 8A shows a state wherein the "Box" tab is active. This display window will be referred to as a Box tab main window.

The Box tab main window shows a list of boxes ensured in the HDD 1500. This display process is done by causing the MFP control unit 1000 to refer to the HDD 1500 and output the result to the operation unit 1008. Upon detecting that the user has touched a desired box button on the operation unit 1008, the MFP control unit 1000 displays the job list window in the corresponding box.

Figure 8B:
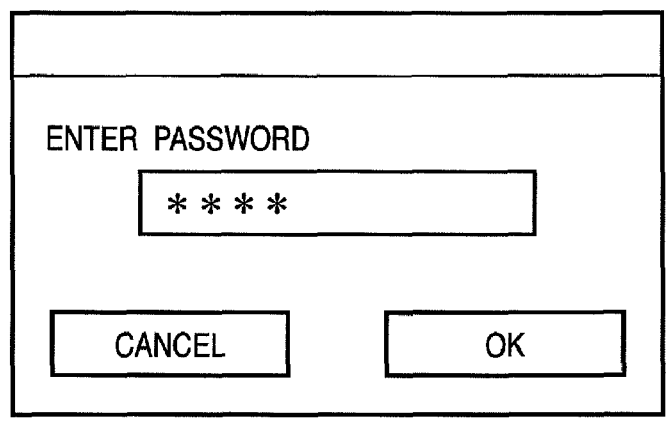
Figure 10B:
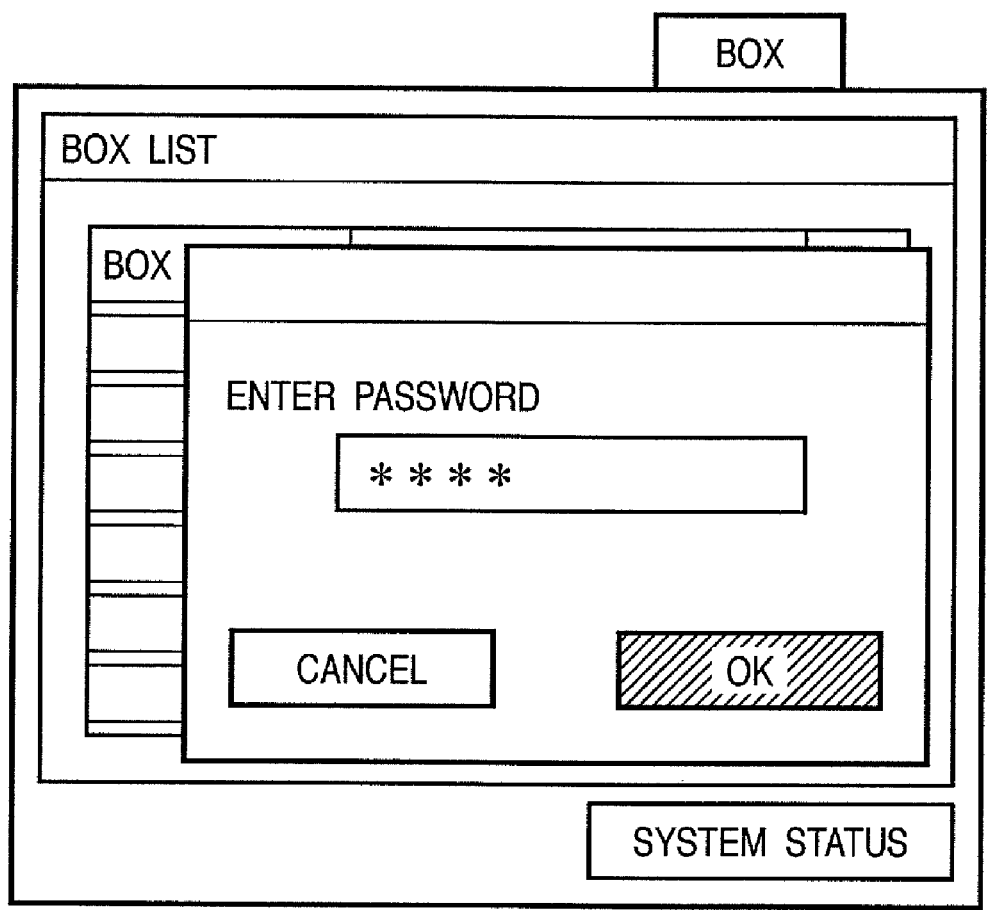
Figure 10C:
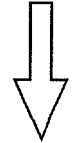

It is possible to set a password for each box. If a password is set, a password input window pops up, as shown in FIG. 8B. When the user inputs a correct password, the display changes to the job list window. The password is input from number keys provided on the operation unit 1008. Instead, a touch screen type keyboard may be displayed on the screen to prompt the user to input the password.

FIG. 9 is a view showing a job list display window displayed when the user has touched box number 01 in the display window shown in FIG. 8A. Each job information displays type, document name, paper (size), pages (total number of pages), and date/time (date/time of job storage).

The user touches one of buttons displayed on the lower side of the screen for a desired one of displayed jobs, thereby requesting the MFP 100 to execute the corresponding process.

The user can select a job by touching the row where the job is displayed on the screen. The user can select a plurality of jobs. When a plurality of jobs are selected, the user can recognize the order of selection by the numbers displayed on the left side of the jobs. To select a plurality of jobs and input a print instruction, the user selects print target jobs and touches a "Print" button. As a result, the print process starts in accordance with the selection order. Job operation buttons include "Detailed information", "Erase", "Print", "Move/copy", and "Send". When the user presses the "Detailed information" button, detailed information of the selected job is displayed. Print settings are displayed in the job list. When the user presses the "Erase" button, the selected job is erased. When the user presses the "Print" button, the selected job is printed. When the user presses the "Send" button, a window to send the selected job by e-mail is displayed. The user presses the "Cancel selection" button to cancel selection.

FIGS. 10A to 10D are views showing transition of the Box tab window. When it is detected that the user has selected one box in the main window (box list display) in FIG. 10A (described above in detail with reference to FIG. 9), and a password has been set for the box, the MFP control unit 1000 displays the password input window shown in FIG. 10B and waits for password input by the user. If the input password is correct, or if no password has been set for the selected box, the MFP control unit 1000 displays the window of the job list in the box in FIG. 10C (described above in detail with reference to FIG. 9). Upon detecting job selection and touch on the "Print" button, the MFP control unit 1000 displays a print window in FIG. 10D. Upon detecting touch on the "Print" button in the print window in FIG. 10D, the MFP control unit 1000 starts the print process of the job and returns the display window to that in FIG. 10A. That is, when the user touches the "Print" button in FIG. 10D, the MFP control unit 1000 does not maintain the state. This is because when a box is selected, an individual may set a password and store a confidential document. If the MFP control unit 1000 executes the above-described process, the user who has input the print start instruction can freely leave the MFP 100 without any problem because the MFP control unit 1000 does not display the window in FIG. 10C unless a correct password is input.

Figure 11:
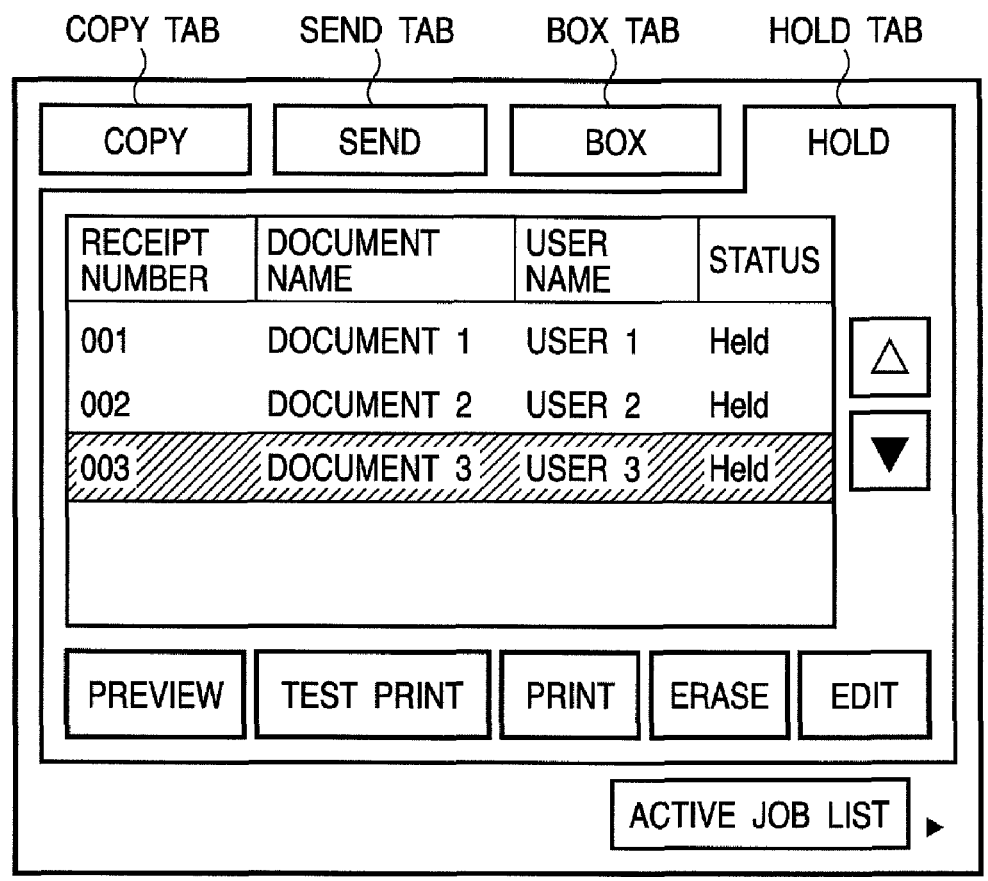
FIG. 11 is a view showing a display example of a hold tab in the touch panel unit of the MFP according to the embodiment.

FIG. 11 shows a display window (to be referred to as a Hold tab main window) obtained by touching the "Hold" tab in FIG. 8A. In other words, when the user touches the "Hold" tab, the MFP control unit 1000 controls the operation unit 1008 to display the main window. The MFP control unit 1000 reads out job information from a folder dedicated to the Hold queue preset in the HDD 1500 and displays a list as shown in FIG. 11.

Unlike the BOX, only one Hold queue exists without password setting. The Hold queue is used to temporarily keep jobs. This window shows "receipt number", "document name", "user name", and "status" as the information of each job stored in the Hold queue. The "status" indicates a job process status. In the Hold queue, the "status" includes "Held" indicating a Hold state and "Store" indicating that data is being stored.

The user can select one or a plurality of jobs. When the user selects a job and touches a button on the lower side of the window, a corresponding job operation is executed. The operations include "Preview", "Test print", "Print", "Erase", and "Edit". "Preview" displays preview of a selected job. "Test print" prints only one copy of a selected job. "Print" prints a selected job. "Erase" erases a selected job. "Edit" allows to change settings of a selected job.

FIG. 12A shows a hold job list window (main window) displayed when the user touches the Hold tab. In this window, the user selects a job as the target of the MFP control unit 1000. Upon detecting touch on the "Print" or "Test print" button, the MFP control unit 1000 starts the print process (more exactly, registration in the print execution queue) and displays a window (active job list window) in FIG. 12B. FIG. 12B shows the print execution queue.

Since the user inputs a print instruction for a job with receipt number "003" in FIG. 12A, FIG. 12B illustrates that the selected job is registered at the rearmost position in the print queue.

Figure 4:
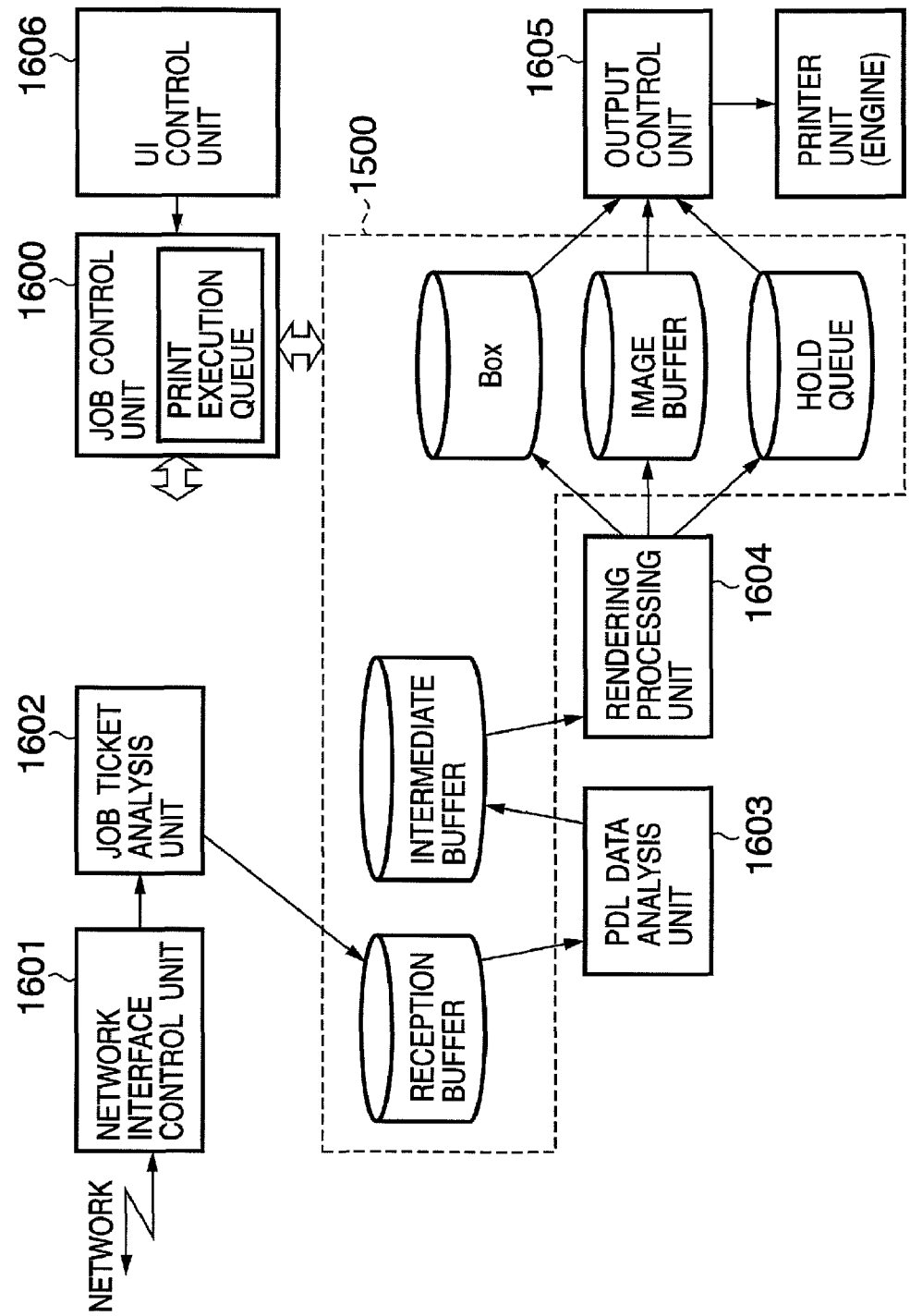
FIG. 4 is a block diagram showing the configuration of firmware that constructs the process of the MFP control unit according to the embodiment.

The job list displayed in the active job list window in FIG. 12B includes a job print-instructed from the Box shown in FIG. 4, a job print-instructed from the image buffer, and a job print-instructed from the Hold queue. That is, all jobs print-instructed in the MFP 100 are displayed.

The window shows "receipt number", "document name", "user name", "status", and "predicted time" as the information of each job. The "status" indicates a job process status and includes "Print" indicating that the print process on paper is in progress and "Standby" indicating that the job registered in the print process queue is waiting for the print process. The "predicted time" indicates a predicted time until the end of printing of the job and is calculated from information such as the number of pages. In this embodiment, each page of a print-instructed job is already converted into image data, as is apparent from FIG. 4. Hence, the predicted time of print standby can be calculated based on the process capability (the number of printed pages per unit time) of the printer unit (printer engine) and the number of pages of each job.

The window shown in FIG. 12B has "Priority print", "Erase", "Detailed information", and "Pause" buttons. The user touches the "Priority print" button to input an instruction for moving up the selected job as much as possible. If the job at the top position is currently being printed, the selected job moves up to the second position.

When the user touches the "Erase" button, the print process of the selected job is canceled, and the job is erased from the list. In other words, upon detecting a touch on the "Erase" button, the MFP control unit 1000 erases the job and reflects the result on the display window on the operation unit 1008.

When the user touches the "Detailed information" button, settings of the job are displayed. When the user touches the "Pause" button, the process of the job is temporarily halted. The "Pause" button is a toggle so that the user can switch by every touch on it between the pause state (temporarily halted state) and the print standby state after canceling the pause. When the user touches the "Hold job list" button, the window returns to that in FIG. 12A.

The Hold queue temporarily keeps jobs and is handled as a shared folder without a password setting. Hence, anyone can store jobs in the Hold queue. In some cases (depending on the workflow in the workplace), the user must always store a job in the Hold queue and then print it after confirming the state of paper set in the apparatus and the like. In this case, the user may want to confirm both the states of jobs in the Hold queue and the state of a job that is being printed. Actually, some printer controllers that are used in the commercial print field and have a large screen display to simultaneously display both states. Many image forming apparatuses, however, have a small display so it is impossible to simultaneously display both states. Even if it is possible, only several rows are displayed, and the recognizability is poor.

In this embodiment, when the user executes the print operation in the window shown in FIG. 12A (when the user touches the "Test print" or "Print" button), the job list in the current print process in FIG. 12B is automatically displayed.

The window shown in FIG. 12B automatically displays a job for which printing is executed as a selected job. The user can immediately perform a job operation (e.g., "Priority print" or "Pause") for the job.

Assume that the window shown in FIG. 12A is kept displayed even after the user selects a job and executes printing. In this case, the user cannot know the job process status after print execution. If a dedicated button to display the window in FIG. 12B is provided, the number of times of operation increases, resulting in cumbersomeness. In this embodiment, however, the display automatically changes to the window shown in FIG. 12B only by selecting a job and inputting a print instruction. Hence, the user can grasp the turn of the selected job. The user can also grasp an approximate time until completion of printing in that state.

Upon detecting job selection and input of a print instruction in the window in FIG. 12A, the MFP control unit 1000 executes the following process.

Jobs registered in the active job list are represented by a variable i (i=1, 2, 3, . . . .) The number of unprinted pages of each job is expressed by P(i). P(i) indicates the total number of unprinted pages of the job i. More specifically, the total number of unprinted pages=number of unprinted pages of document×number of copies. Let V be the print capability of the printer unit, i.e., the number of printed pages per unit time (one min in this embodiment).

Then, a wait time T(k) until completion of printing of the kth job is given by $$T(k)=\Sigma P(i)/V$$

where Σ is the sum function of the variable i=1, 2, . . . , k.

The MFP control unit 1000 calculates the predicted print completion wait time of each job by executing the above calculation for each job registered in the active job list and displays the result.

Even during display in FIG. 12B, the MFP control unit 1000 executes the above-described process at an appropriate time interval. In this embodiment, the time interval is one min. In the above example, a relative time from the current time is displayed. Instead, a print completion time may be displayed by adding the wait time to the current time.

Figure 13:
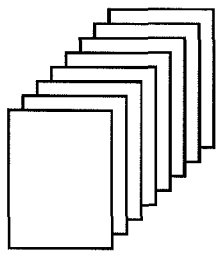
FIG. 13 is a view showing a job management table managed by the MFP control unit according to the embodiment.

FIG. 13 shows a table to manage jobs in the image forming apparatus. The HDD 1500 holds this table.

The job management table includes job IDs, pointers to an attribute information management table, and pointers to image data. The MFP control unit 1000 issues a job ID to manage a job.

The job management table includes tables for active jobs, hold jobs, and box jobs.

The attribute management table stores the attributes of jobs, including attribute IDs and attribute values. Image data is managed as page data for each job.

The process procedure of the MFP control unit 1000 according to this embodiment will be described next with reference to the flowcharts in FIGS. 14 to 18.

Figure 14:
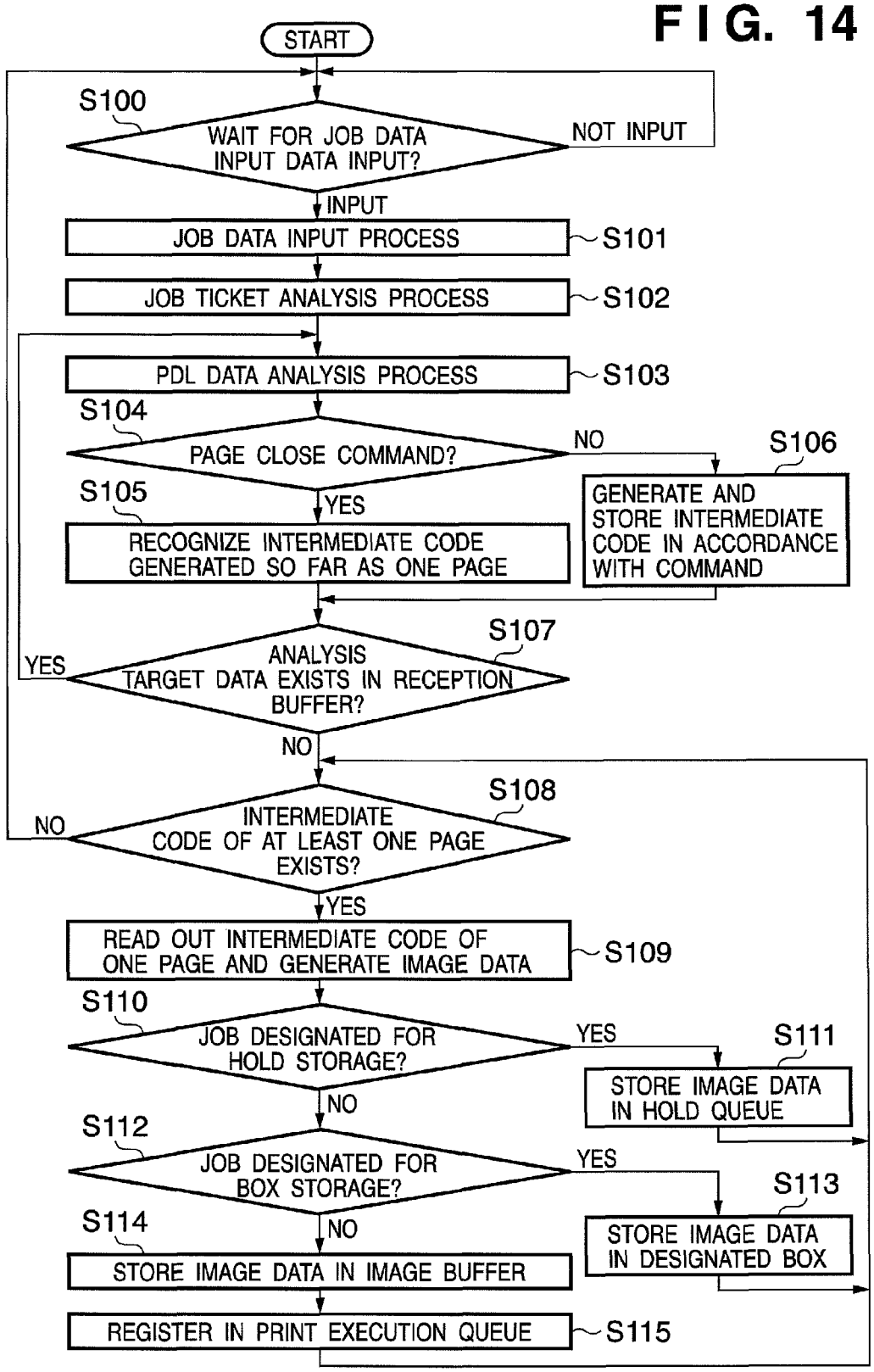
FIG. 14 is a flowchart showing the main process of the MFP control unit according to the embodiment.

FIG. 14 showing the main process of the MFP control unit 1000 according to the embodiment.

When the apparatus is powered on, the MFP control unit 1000 waits for reception of print job data in step S100 (step S100). When the MFP control unit 1000 detects reception of print job data, the process advances to step S101 to execute the input process of the print job data. The process in steps S100 and S101 is equivalent to the process of the network interface control unit 1601 executed by the MFP control unit 1000.

The MFP control unit 1000 advances the process to step S102 to execute the process of the job ticket analysis unit 1602, thereby analyzing the received print job data. As a result of analysis, the MFP control unit 1000 stores print data (PDL data) in the reception buffer of the HDD 1500. The MFP control unit 1000 analyzes the job ticket and determines which one of Hold, Box, and normal printing is indicated by the job. If the job is a Hold job, the MFP control unit 1000 registers the job in the Hold job management table. If the job is a Box job, the MFP control unit 1000 registers the job in the Box job management table with the designated Box number. A job for normal printing is directly registered in the print queue. Hence, the MFP control unit 1000 registered the job in the active job management table.

The MFP control unit 1000 advances the process to step S103 to analyze the PDL data stored in the reception buffer (the PDL data analysis process will be described later in detail). The MFP control unit 1000 determines in step S104 whether the command is a page close command (including determination of whether the command indicates the end of process of one page). If the command is a page close command, the MFP control unit 1000 recognizes an intermediate code generated so far as data of one page. The intermediate code is managed for each page, as described above.

If the MFP control unit 1000 determines in step S104 that the command is not a page close command, the process advances to step S106 to generate an intermediate code with a format suitable for an internal process in accordance with the command.

In step S107, the MFP control unit 1000 checks whether data to be analyzed exists in the reception buffer. If the MFP control unit 1000 determines that data to be analyzed exists, the process returns to step S103 to repeat the PDL data analysis process. If the MFP control unit 1000 determines that no data to be analyzed exists in the reception buffer, the process advances to step S108.

The MFP control unit 1000 checks in step S108 whether an intermediate code of at least one page exists. If the MFP control unit 1000 determines that an intermediate code of at least one page exists, the process advances to step S109 to read out the intermediate code of one page and generate image data (bitmap) from the intermediate code.

In step S110, the MFP control unit 1000 determines whether the job is designated for Hold. If the job is designated for Hold, the MFP control unit 1000 advances the process to step S111 to store the generated image data in the Hold queue ensured in the HDD.

If the MFP control unit 1000 determines that the job is not designated for Hold, the process advances to step S112. In step S112, the MFP control unit 1000 determines whether the job of interest is designated for Box storage. If the job of interest is designated for Box storage, the MFP control unit 1000 advances the process to step S113 to store the image data in a Box designated by the job ticket.

If the MFP control unit 1000 determines that the job of interest is a job (normal print job) that is not designated for Box storage, the process advances to step S114 to store the image data of one page in the image buffer. In step S115, if the page stored in the image buffer is the first page of the normal print job, the MFP control unit 1000 registers the job ID in the print execution queue.

At this time, if no other job is being printed, i.e., if the job is registered at the top of the print execution queue, the MFP control unit 1000 starts a process of reading out the image data of one page from the image buffer, converting the image data into a video signal, and transferring the signal to the printer unit (engine). The printer unit prints on actual based on the video signal and discharges the printed printing paper sheet to the outside.

Transfer to the printer unit and the storage process in the image buffer are not synchronized. Normally, the speed of conversion to image data is higher than the print speed of the printer unit. Hence, image data of unprinted pages are gradually accumulated in the image buffer.

After the process in step S115, the MFP control unit 1000 returns the process to step S108. If the intermediate code of one page is not completed in step S108, the process returns to step S101 to wait for subsequent input data.

Figure 15:
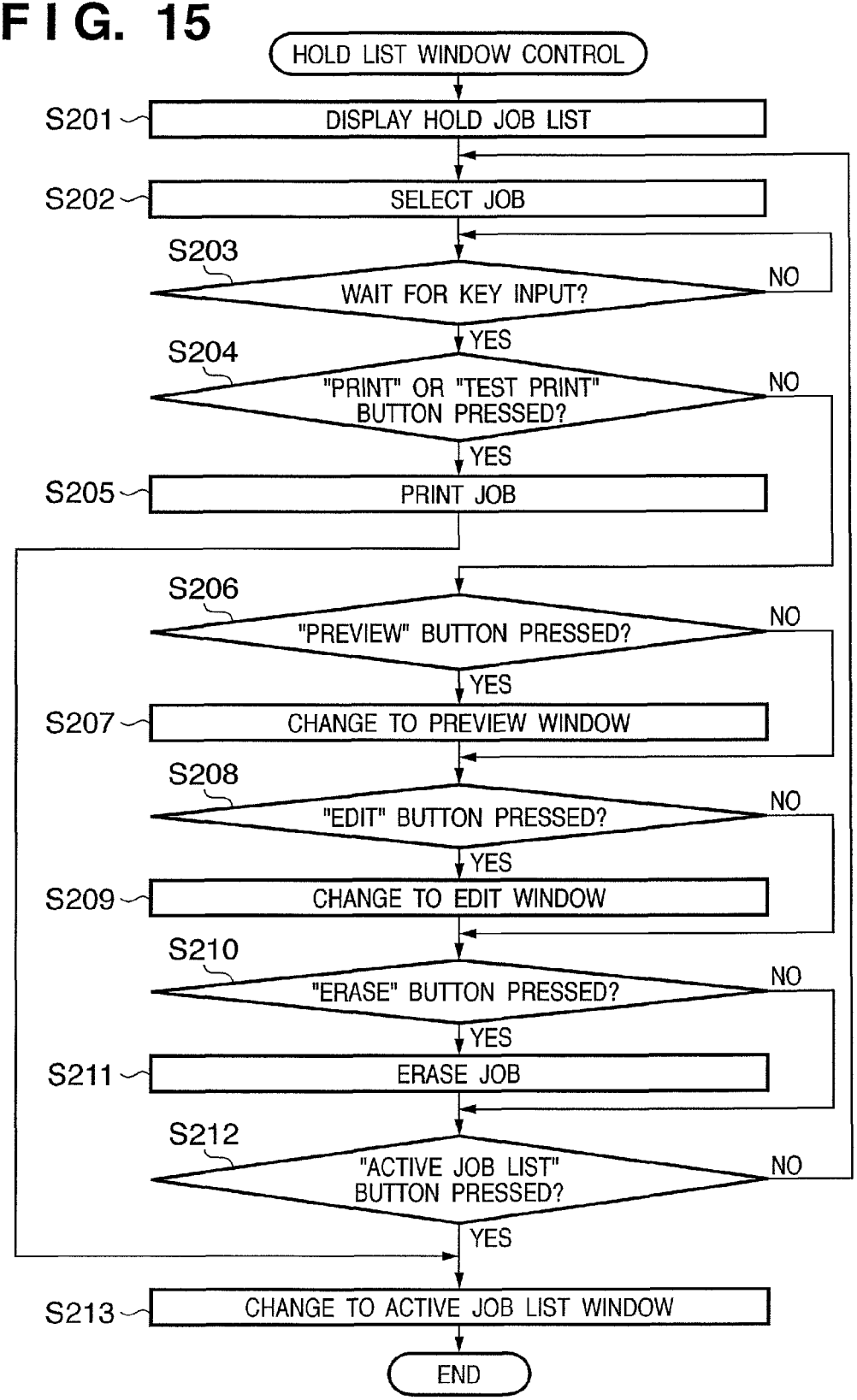
FIG. 15 is a flowchart showing a Hold list display process executed by the MFP control unit according to the embodiment.

FIG. 15 is a flowchart showing a Hold list display process by the MFP control unit and processes corresponding user input to the touch panel. The MFP control unit 1000 executes the process in FIG. 15 as a task different from the main process in FIG. 14.

In step S201, the MFP control unit 1000 displays a list of Hold jobs stored in the Hold queue in accordance with the information in the Hold job management table.

In step S202, the MFP control unit 1000 waits for job selection. As described above, the user can select one or a plurality of jobs from the displayed list. In the initial state, the top list job is displayed.

The MFP control unit 1000 advances the process to step S203 to wait for key input. Upon detecting key input, the MFP control unit 1000 advances the process to step S204.

In step S204, the MFP control unit 1000 determines based on user touch position information from the operation unit 1008 whether the user has touched the "Print" or "Text print" button (this process will simply be expressed as "the MFP control unit 1000 determines whether the user has touched the "xxxx" button" hereinafter).

Upon detecting touch on the "Print" or "Test print" button, the MFP control unit 1000 advances the process to step S205 to start the print process of the job. The MFP control unit 1000 advances the process to step S213 to display the active job list window. In the test print mode, the MFP control unit 1000 executes the print process of only one copy independently of the actual number of copies.

If the MFP control unit 1000 determines in step S204 that the user has touched neither the "Print" button nor the "Test print", the process advances to step S206.

In step S206, the MFP control unit 1000 determines whether the user has touched the "Preview" button. If the MFP control unit 1000 determines that the user has touched the "Preview" button, the process advances to step S207 to display a preview window of the first page of the job.

In step S208, the MFP control unit 1000 determines whether the user has touched the "Edit" button. If the MFP control unit 1000 determines that the user has touched the "Edit" button, the process advances to step S209 to display a job ticket editing window. If the MFP control unit 1000 determines that the touched button is not the "Edit" button, the process advances to step S210.

In step S210, the MFP control unit 1000 determines whether the user has touched the "Erase" button. If the MFP control unit 1000 determines that the user has touched the "Erase" button, the process advances to step S211 to delete the selected job. More specifically, the MFP control unit 1000 deletes corresponding data in the Hold job management table and erases image data in the Hold queue.

In step S212, the MFP control unit 1000 determines whether the user has touched the "Active job list" button. If the MFP control unit 1000 determines that the user has touched the "Active job list" button, the process advances to step S213 to display the active job list window (window shown in FIG. 12B).

Figure 16:
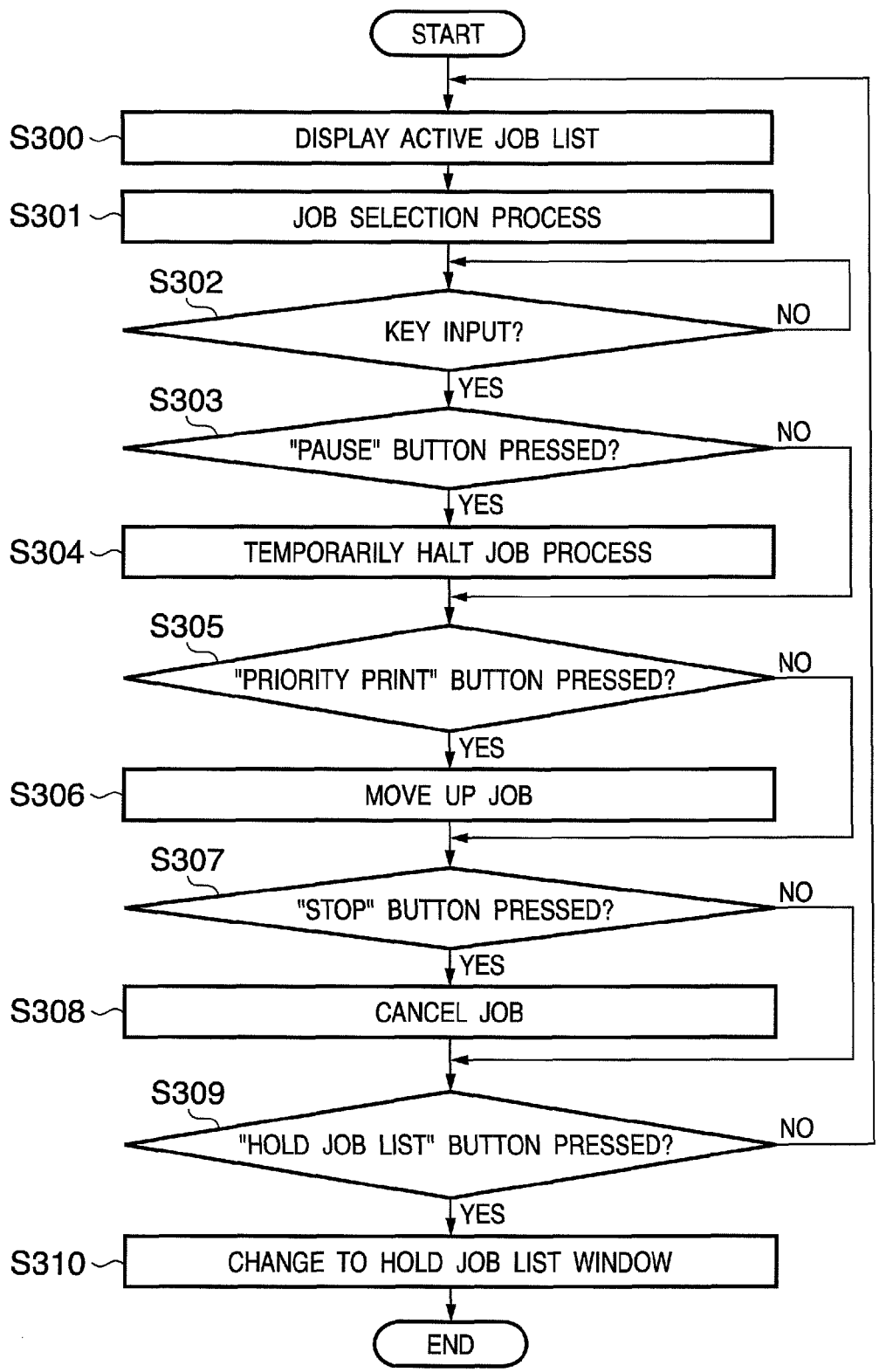
FIG. 16 is a flowchart showing an active job list display process executed by the MFP control unit according to the embodiment.

FIG. 16 is a flowchart showing the active job list (FIG. 12B) display process executed by the MFP control unit 1000 and processes corresponding user input.

In step S300, the MFP control unit 1000 displays the active job list. At this time, the MFP control unit 1000 refers to each job management table and calculates and displays the print completion time of each job based on the number of unprinted pages and the number of copies of each active job registered in the print queue.

When the display process is complete, the MFP control unit 1000 advances the process to step S301 to execute a process corresponding to user's job selection (e.g., a process of highlighting a selected job).

The MFP control unit 1000 advances the process to step S302 to wait for touch (key input) on various displayed buttons. If the MFP control unit 1000 determines that the operator has done key input (on the touch panel of this embodiment), the process advances to step S303.

In step S303, the MFP control unit 1000 determines whether the user has touched the "Pause" button. If the MFP control unit 1000 determines that the user has touched the "Pause" button, the process advances to step S304 to temporarily halt the print process of the job. The MFP control unit 1000 displays that the job is in a pause state.

Upon determining that the selected job is already in the pause job state (displayed as "resume state"), and the user has touched the "Pause" button, the MFP control unit 1000 cancels the pause state and advances the process to step S305.

In step S305, the MFP control unit 1000 determines whether the user has touched the "Priority print" button. If the MFP control unit 1000 determines that the user has touched the "Priority print" button, the process advances to step S306 to move up the selected job. Since the selected job cannot pass ahead the job that is currently being processed, the MFP control unit 1000 moves the selected job ahead of jobs whose print process on paper has not started yet.

In step S309, the MFP control unit 1000 determines whether the user has touched the "Hold job list" button. If the MFP control unit 1000 detects touch on the "Hold job list" button, the process advances to step S310 to display a Hold job list window (the window shown in FIG. 11).

If the MFP control unit 1000 determines in step S309 that the touched button is not the "Hold job list" button, the key input process is regarded to be complete, and the process returns to step S300. If the job print sequence changes, the MFP control unit 1000 executes step S300 again. For this reason, the print completion time of each job is also updated.

Figure 17:
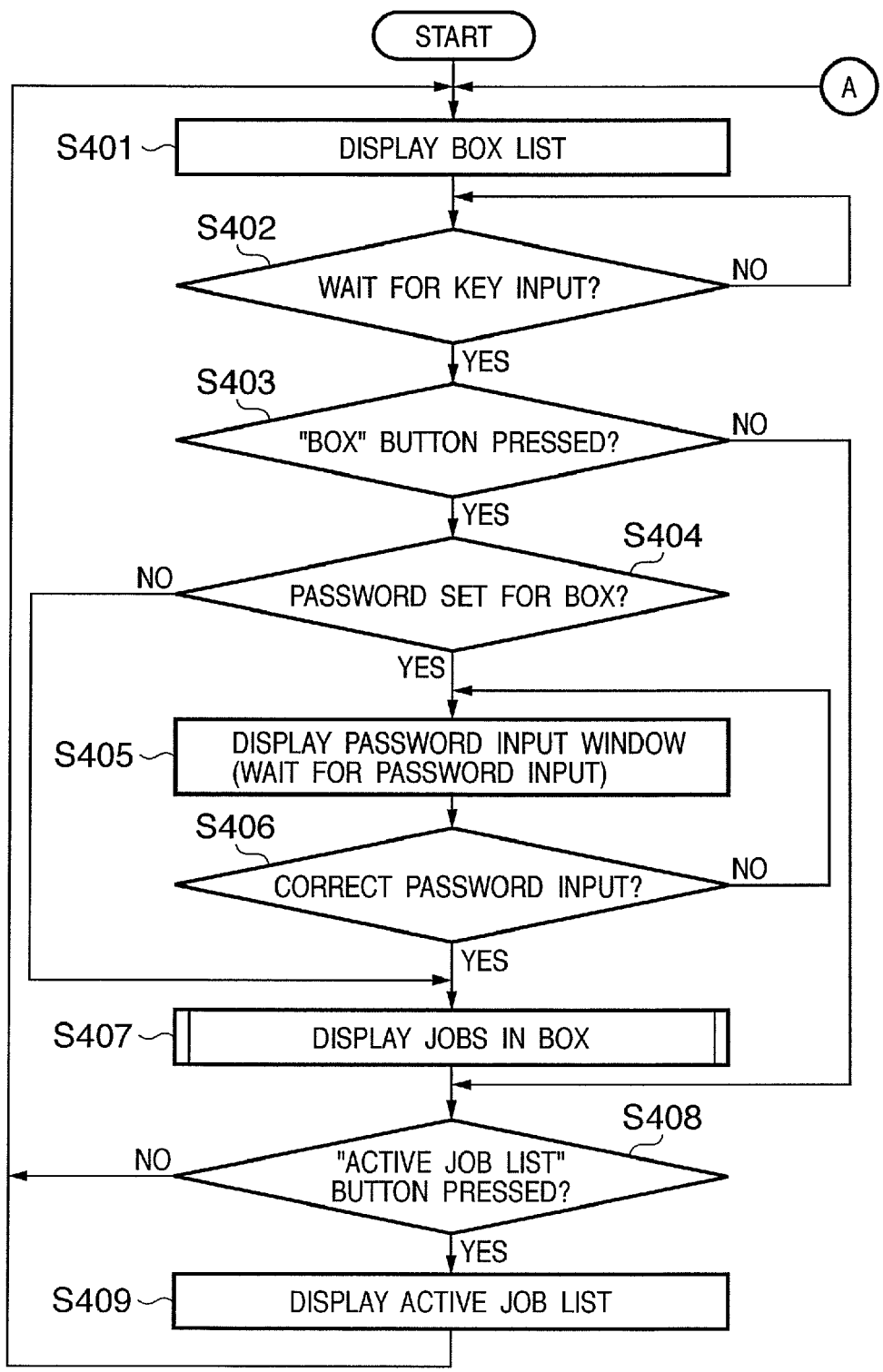
FIG. 17 is a flowchart showing a BOX list display process executed by the MFP control unit according to the embodiment.
Figure 18:
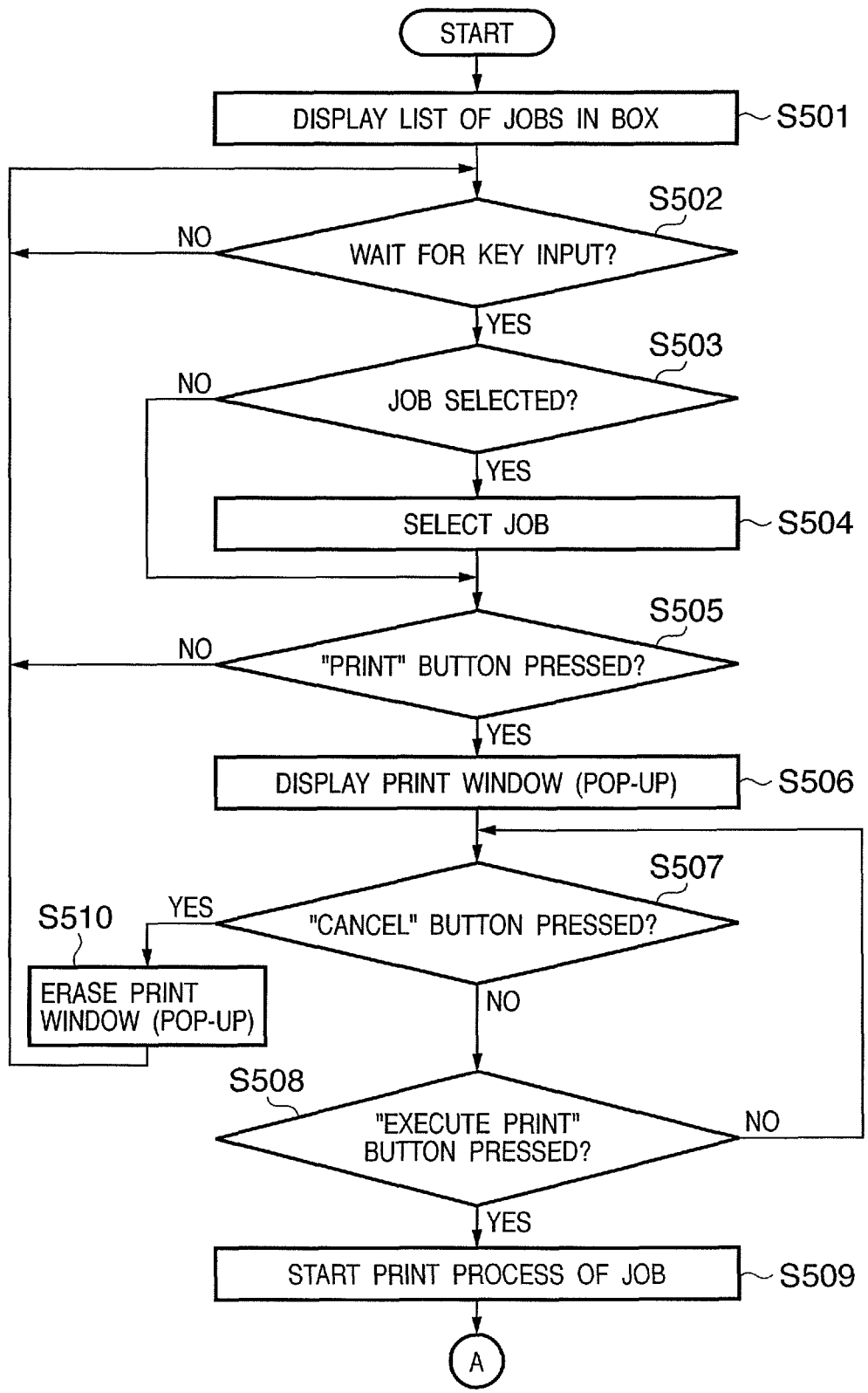
FIG. 18 is a flowchart showing an intra-BOX job list display process executed by the MFP control unit according to the embodiment.

FIGS. 17 and 18 are flowcharts showing the Box list display process and processes corresponding user input. These flowcharts are related to control of the windows shown in FIGS. 8A and 8B.

In step S401, the MFP control unit 1000 displays the Box list. As information of each Box, the Box number, name, and utilization amount are displayed. Although the name can be set by the user, a detailed description thereof will be omitted here.

The MFP control unit 1000 advances the process to step S402 to wait for user instruction input.

In step S403, the MFP control unit 1000 determines whether the user input indicates the "Box" button. In other words, the MFP control unit 1000 determines which Box is selected by the user.

If the MFP control unit 1000 determines that the user has touched the "Box" button, the process advances to step S404 to determine whether a password is set for the selected Box. If the MFP control unit 1000 determines that no password is set for the Box selected by the user, the process advances to step S407. If the MFP control unit 1000 determines that a password is set for the selected Box, the process advances to step S405 to display a password input window. The MFP control unit 1000 compares a password input by the user with the password set for the Box and determines whether the two passwords match. Only upon determining that they match does the process advance to step S407.

The HDD saves a file representing the correspondence between Boxes and passwords. The password input region has data "null" in the default. If the password input region is "null", the MFP control unit 1000 determines that no password is set for the selected Box. If data except "null" is stored, the MFP control unit 1000 determines that a password is set.

In step S407, the MFP control unit 1000 displays the list of jobs in the selected Box (FIG. 9).

In step S408, the MFP control unit 1000 determines whether the user has touched the "Active job list" button. If the MFP control unit 1000 detects touch on the "Active job list" button, the process advances to step S409 to display the active job list (FIG. 12B). If the MFP control unit 1000 detects touch on a button other than the "Active job list" button, the process returns to step S401.

FIG. 18 is a flowchart showing the process of displaying a job list in a Box, which is executed by the MFP control unit 1000, and processes corresponding to user input.

In step S501, the MFP control unit 1000 displays a list of jobs in a Box selected by the user (FIG. 9).

The MFP control unit 1000 advances the process to step S502 to wait for user input.

Upon detecting user input the MFP control unit 1000 advances the process to step S503 to determine whether the input indicates a job selection instruction. To select a desired job, the user touches the row of the job. If the MFP control unit 1000 determines that the input indicates job selection, the process advances to step S504 to select a job. Information (job ID in this embodiment) to specify the selected job is stored in the RAM (not shown) of the MFP control unit 1000. Additionally, the row of the selected job is highlighted to explicitly indicate it. When at least one job is selected, the MFP control unit 1000 enables and displays a "Print" button.

If the MFP control unit 1000 determines that the user input does not indicate job selection, the process advances to step S505 to determine whether the user has touched the "Print" button. The presence/absence of a touch on the "Print" button is confirmed only when at least one job is selected, as described above.

If the MFP control unit 1000 determines that the touched button is not the "Print" button, or no job is selected, the process returns to step S502.

If the MFP control unit 1000 determines that the user has touched the "Print" button, the process advances to step S506 to display a print window (pop-up window).

In step S507, the MFP control unit 1000 determines whether the user has touched the "Cancel" button. Upon detecting a touch on the "Cancel" button, the MFP control unit 1000 advances the process to step S510 to erase the pop-up window. Then, the process returns to step S502.

If the MFP control unit 1000 determines that the touched button is not the "Cancel" button, the process advances to step S508 to determine whether the user has touched the "Execute print" button. If the MFP control unit 1000 determines that the user has touched a button other than the "Execute print" button, the process returns to step S507.

If the MFP control unit 1000 determines in step S508 that the user has touched the "Execute print" button, the process advances to step S509 to start the print process of the selected job (register the job in the print queue). Then, the process returns to step S401.

As described above, according to this embodiment, jobs designated for Hold are displayed. The user needs only to select a desired job and input a print instruction. Then, the MFP control unit 1000 can display the active job list and display not only the print order of the selected job but also the predicted time required until completion of printing.
Checked to Here Second Embodiment In the first embodiment, only the list of Hold jobs is displayed in the Hold job list display window. In the second embodiment to be described below, a Hold job list and an active job list are displays simultaneously.

Figures 19A, 19B:
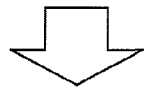
FIGS. 19A and 19B are views showing window transition according to the second embodiment.

FIG. 19A shows an example of a Hold tab window of the touch panel unit of an operation unit 1008 according to the second embodiment.

An MFP control unit 1000 displays "receipt number", "document name", "user name", and "status" as the information of each job in each of the Hold job list and active job list.

The MFP control unit 1000 also displays "Edit", "Preview", "Test print", "Print", and "Erase" buttons as job operation buttons for the Hold job list.

The MFP control unit 1000 displays "Priority print", "Detailed information", "Pause", and "Stop" buttons as job operation buttons for the active job list.

The process of the MFP control unit 1000 when the user touches each button is the same as described in the first embodiment.

If the MFP control unit 1000 detects that the user has selected a job in the Hold job list and touched the "Print" or "Test print" button, or when the user presses the "Active job list" button, the active job list window in FIG. 19B is displayed.

The window shown in FIG. 19B automatically displays a job for which printing is executed as a selected job. The user can immediately perform a job operation (e.g., "Priority print" or "Pause") for the job, as in the first embodiment.

Third Embodiment

In the second embodiment, the MFP control unit 1000 displays the Hold job list and active job list simultaneously in two split windows. In executing printing, the display changes to the window including only the active job list. In the third embodiment, even in executing printing, the Hold job list and active job list are simultaneously displayed in two split windows.

Figure 20A:
FIGS. 20A and 20B are views showing window transition according to the second embodiment.

FIG. 20A shows an example of a Hold tab window of the touch panel unit displayed by an MFP control unit 1000 according to the third embodiment.

Figure 20B:

In the state shown in FIG. 20A, if the MFP control unit 1000 detects selection of a job in the Hold job list and touch on the "Print" or "Test print" button, the list of jobs to be subjected to the print process in the active job list is updated, as shown in FIG. 20B. The window shown in FIG. 20B automatically displays a job for which printing is executed as a selected job. The user can immediately perform a job operation (e.g., "Priority print" or "Pause") for the job.

The embodiments of the present invention have been described above. In the embodiments, the image forming apparatus is applied to an MFP, i.e., multi function peripheral. However, the image forming apparatus may be a single printing apparatus having the operation unit and high-capacity memory device described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A job processing apparatus comprising:
a receiving unit configured to receive first type jobs, each having a specific attribute, and second type jobs, each not having the specific attribute;
a storage unit configured to store jobs received by the receiving unit;
a first control unit configured to control a display unit so that the display unit displays a list of the first type jobs stored in the storage unit on a first display screen;
a detection unit configured to detect an execution instruction for a specific job in the list of the first type jobs displayed on the first display screen;
an execution unit configured to execute the second type job without detecting the execution instruction, and to execute the specific job in a case where the detection unit detects the execution instruction for the specific job in the list of the first type jobs displayed on the first display screen; and
a second control unit configured to, if the detection unit detects the execution instruction for the specific job in the list of the first type jobs displayed on the first display screen, control the display unit to switch from the first display screen displaying the list of the first type jobs including the specific job to a second display screen displaying a list of the second type jobs having not yet been completed and the specific job,
wherein the second display screen does not include a screen displaying the list of the first type jobs excluding the specific job.

2. The apparatus according to claim 1, wherein the second control unit is configured to control the display unit so that the display unit displays the status of second type jobs having not yet been completed and the status of the specific job on the second display screen.

3. The apparatus according to claim 1, wherein the second control unit is configured to control the display unit so that the display unit displays predicted times for the second type jobs having not yet been completed and a predicted time for the specific job on the second display screen.

4. The apparatus according to claim 1, wherein the first and the second type jobs are print jobs.

5. The apparatus according to claim 1, further comprising a designation unit configured to designate an execution order for jobs included in the second display screen.

6. The apparatus according to claim 1, further comprising a stopping unit configured to stop performing a job included in the second display screen.

7. The apparatus according to claim 1, wherein said second control unit is configured to control the display unit to indicate that the specific job is being selected in the second display screen.

8. A job processing apparatus comprising:
a receiving unit configured to receive first type jobs, each having a specific attribute, and second type jobs, each not having the specific attribute;
a storage unit configured to store jobs received by the receiving unit;
a first control unit configured to control a display unit so that the display unit displays a first job list of the first type jobs and a second job list of the second type jobs stored in the storage unit on a first display screen;
a detection unit configured to detect an execution instruction for a specific job in the first job list displayed on the first display screen;
an execution unit configured to execute the second type job without detecting the execution instruction, and to execute the specific job in a case where the detection unit detects the execution instruction for the specific job in the first job list displayed on the first display screen; and
a second control unit configured to, if the detection unit detects the execution instruction for the specific job in the first job list displayed on the first display screen, control the display unit to switch from the first display screen displaying the first job list and the second job list to a second display screen which excludes the first job list and includes a list of the second type jobs having not yet been completed and the specific job,
wherein the second display screen does not include a screen displaying the first job list of the first type jobs excluding the specific job.

9. The apparatus according to claim 8, wherein the second control unit is configured to control the display unit so that the display unit displays a status of second type jobs having not yet been completed and a status of the specific job on the second display screen.

10. The apparatus according to claim 8, wherein the second control unit is configured to control the display unit so that the display unit displays predicted times for the second type jobs having not yet been completed and a predicted time for the specific job on the second display screen.

11. The apparatus according to claim 8, wherein the first and the second type jobs are print jobs.

12. The apparatus according to claim 8, further comprising a designation unit configured to designate an execution order for jobs included in the second display screen.

13. The apparatus according to claim 8, further comprising a stopping unit configured to stop performing a job included in the second display screen.

14. The apparatus according to claim 8, wherein the second control unit is configured to control the display unit to indicate that the specific job is being selected in the second display screen.

15. A job processing apparatus comprising:
a receiving unit configured to receive first type jobs, each having a specific attribute, and second type jobs, each not having the specific attribute;
a storage unit configured to store jobs received by the receiving unit;
a first control unit configured to control a display unit so that the display unit displays a list of the first type jobs stored in the storage unit on a first display screen;
a detection unit configured to detect an execution instruction for a specific job in the list displayed on the first display screen; and
a second control unit configured to, if the detection unit detects the execution instruction for the specific job in the list of the first type jobs displayed on the first display screen, control the display unit to switch from the first display screen displaying the list of the first type jobs including the specific job to a second display screen including a list of the second type jobs having not yet been completed and the specific job,
wherein the second display screen does not include a screen displaying the list of the first type jobs excluding the specific job.

16. The apparatus according to claim 15, wherein the second control unit is configured to control the display unit so that the display unit displays a status of second type jobs having not yet been completed and a status of the specific job on the second display screen.

17. The apparatus according to claim 15, wherein the second control unit is configured to control the display unit so that the display unit displays predicted times for the second type jobs having not yet been completed and a predicted time for the specific job on the second display screen.

18. The apparatus according to claim 15, wherein the first and the second type jobs are print jobs.

19. The apparatus according to claim 15, further comprising a designation unit configured to designate an execution order for jobs included in the second display screen.

20. The apparatus according to claim 15, further comprising a stopping unit configured to stop performing a job included in the second display screen.

21. The apparatus according to claim 15, wherein said second control unit is configured to control the display unit to indicate that the specific job is being selected in the second display screen.

22. A job processing apparatus comprising:
a receiving unit configured to receive first type jobs, each having a specific attribute, and second type jobs, each not having the specific attribute;
a storage unit configured to store jobs received by the receiving unit;
a first control unit configured to control a display unit so that the display unit displays a first job list of the first type jobs and a second job list of the second type jobs stored in the storage unit on a first display screen;
a detection unit configured to detect an execution instruction for a specific job in the first job list displayed on the first display screen; and
a second control unit configured to, if the detection unit detects the execution instruction for the specific job in the list of the first type jobs displayed on the first display screen, control the display unit to switch from the first display screen displaying the first job list and the second job list to a second display screen which excludes the first job list and includes a list of the second type jobs having not yet been completed and the specific job,
wherein the second display screen does not include a screen displaying the first job list of the first type jobs excluding the specific job.

23. The apparatus according to claim 22, wherein the second control unit is configured to control the display unit so that the display unit displays a status of second type jobs having not yet been completed and a status of the specific job on the second display screen.

24. The apparatus according to claim 22, wherein the second control unit is configured to control the display unit so that the display unit displays predicted times for the second type jobs having not yet been completed and a predicted time for the specific job on the second display screen.

25. The apparatus according to claim 22, wherein the first and the second type jobs are print jobs.

26. The apparatus according to claim 22, further comprising a designation unit configured to designate an execution order for jobs included in the second display screen.

27. The apparatus according to claim 22, further comprising a stopping unit configured to stop performing a job included in the second display screen.

28. The apparatus according to claim 22, wherein the second control unit is configured to control the display unit to indicate that the specific job is being selected in the second display screen.

29. A method for controlling a job processing apparatus, comprising:
receiving first type jobs, each having a specific attribute, and second type jobs, each not having the specific attribute;
storing, into a storage unit, the received jobs;
controlling a display unit so that the display unit displays a list of the first type jobs stored in the storage unit on a first display screen;
detecting an execution instruction for a specific job in the list of the first type jobs displayed on the first display screen; and
controlling, if the execution instruction for the specific job in the list of the first type jobs displayed on the first display screen is detected, the display unit to switch from the first display screen displaying the list of the first type jobs including the specific job to a second display screen displaying a list of the second type jobs having not yet been completed and the specific job,
wherein the second display screen does not include a screen displaying the list of the first type jobs excluding the specific job.

30. A method for controlling a job processing apparatus, comprising:
receiving first type jobs, each having a specific attribute, and second type jobs, each not having the specific attribute;
storing, into a storage unit, the received jobs;
controlling a display unit so that the display unit displays a first job list of the first type jobs and a second job list of the second type jobs stored in the storage unit on a first display screen;
detecting an execution instruction for a specific job in the first job list displayed on the first display screen; and
controlling, if the execution instruction for the specific job in the list of the first type jobs displayed on the display screen is detected, the display unit to switch from the first display screen displaying the first job list and the second job list to a second display screen which excludes the first job list and includes a list of the second type jobs having not yet been completed and the specific job,
wherein the second display screen does not include a screen displaying the first job list of the first type jobs excluding the specific job.

31. A non-transitory computer-readable storage medium storing a program configured to be executed at least by a computer of a job processing apparatus, the program comprising:
a receiving module configured to receive first type jobs, each having a specific attribute, and second type jobs, each not having the specific attribute;
a storage module configured to store jobs received by the receiving module in a storage unit;
a first control module configured to control a display unit so that the display unit displays a list of the first type jobs stored in the storage unit on a first display screen;
a detection module configured to detect an execution instruction for a specific job in the list displayed on the first display screen; and
a second control module configured to, if the detection module detects the execution instruction for the specific job in the list of the first type jobs displayed on the first display screen, control the display unit to switch from the first display screen displaying the list of the first type jobs including the specific job to a second display screen including a list of the second type jobs having not yet been completed and the specific job,
wherein the second display screen does not include a screen displaying the list of the first type jobs excluding the specific job.

32. A non-transitory computer-readable storage medium storing a program configured to be executed at least by a computer of a job processing apparatus, the program comprising:

- a receiving module configured to receive first type jobs, each having a specific attribute, and second type jobs, each not having the specific attribute;
- a storage module configured to store jobs received by the receiving module in a storage unit;
- a first control module configured to control a display unit so that the display unit displays a first job list of the first type jobs and a second job list of the second type jobs stored in the storage unit on a first display screen;
- a detection module configured to detect an execution instruction for a specific job in the first job list displayed on the first display screen; and
- a second control module configured to, if the detection module detects the execution instruction for the specific job in the list of the first type jobs displayed on the first display screen, control the display unit to switch from the first display screen displaying the first job list and the second job list to a second display screen which excludes the first job list and includes a list of the second type jobs having not yet been completed and the specific job, wherein the second display screen does not include a screen displaying the first job list of the first type jobs excluding the specific job.

* * * * *